US011893926B2

(12) United States Patent
Yu et al.

(10) Patent No.: US 11,893,926 B2
(45) Date of Patent: Feb. 6, 2024

(54) EMISSIVE DISPLAY DEVICE

(71) Applicant: Samsung Display Co., LTD., Yongin-si (KR)

(72) Inventors: Byung Chang Yu, Yongin-si (KR); Hae Min Kim, Yongin-si (KR); Myunghoon Park, Yongin-si (KR); Dong-Hoon Lee, Yongin-si (KR); Kyung Hoon Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/110,549

(22) Filed: Feb. 16, 2023

(65) Prior Publication Data

US 2023/0377510 A1 Nov. 23, 2023

(30) Foreign Application Priority Data

May 18, 2022 (KR) ........................ 10-2022-0061064

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01)

(58) Field of Classification Search
None
See application file for complete search history.

(56) References Cited

U.S. PATENT DOCUMENTS

2019/0066598 A1* 2/2019 Kim ..................... G09G 3/3233
2022/0284857 A1* 9/2022 Li ........................ G09G 3/3233

FOREIGN PATENT DOCUMENTS

KR 10-2014-0080728 7/2014
KR 10-2016-0018892 2/2016
KR 10-2016-0074772 6/2016
KR 10-2023232 9/2019
KR 10-2021-0049900 5/2021

* cited by examiner

*Primary Examiner* — Stephen T. Reed
(74) *Attorney, Agent, or Firm* — KILE PARK REED & HOUTTEMAN PLLC

(57) ABSTRACT

Embodiments provide an emissive display device including a driving transistor including a first electrode, a second electrode, and a driving gate electrode, a second transistor including a first electrode electrically connected to a data line, a transfer capacitor including a first transfer electrode electrically connected to a second electrode of the second transistor and a second transfer electrode electrically connected to the driving gate electrode; a fifth transistor electrically connecting the first electrode of the driving transistor and the driving gate electrode; a ninth transistor including a second electrode electrically connected to the second electrode of the driving transistor; and a light emitting diode including an anode and a cathode receiving an output current outputted to the second electrode of the driving transistor.

20 Claims, 30 Drawing Sheets

EMISSIVE DISPLAY DEVICE

CROSS-REFERENCE TO RELATED APPLICATION(S)

This application claims priority to and benefits of Korean Patent Application No. 10-2022-0061064 under 35 U.S.C. § 119, filed in the Korean Intellectual Property Office (KIPO) on May 18, 2022, the entire contents of which are incorporated herein by reference.

BACKGROUND

1. Technical Field

The disclosure relates to an emissive display device in which a pixel includes a driving transistor that is an n-type transistor.

2. Description of the Related Art

A display device serves to display a screen, and may include a liquid crystal display, an organic light emitting diode display, or the like. Such a display device may be used in various electronic devices such as mobile phones, navigation units, digital cameras, electronic books, portable game machines, and various terminals.

A display device such as an organic light emitting diode display may have a structure in which the display device can be bent or folded using a flexible substrate.

Various developments are being made to the pixel structure employed in organic light emitting diode displays.

The above information disclosed in this Background section is only for enhancement of understanding of the background of the described technology, and therefore, it may contain information that does not form the prior art that is already known in this country to a person of ordinary skill in the art.

SUMMARY

Embodiments have been made to provide an emissive display device including a pixel in which a driving transistor may be an n-type transistor.

An embodiment provides an emissive display device that may include a driving transistor including a first electrode, a second electrode, and a driving gate electrode, a second transistor including a first electrode electrically connected to a data line, a transfer capacitor including a first transfer electrode electrically connected to a second electrode of the second transistor and a second transfer electrode electrically connected to the driving gate electrode, a fifth transistor electrically connecting the first electrode of the driving transistor and the driving gate electrode, a ninth transistor including a second electrode electrically connected to the second electrode of the driving transistor, and a light emitting diode including an anode and a cathode receiving an output current outputted to the second electrode of the driving transistor.

A first electrode of the ninth transistor may be electrically connected to at least one of a compensation voltage line and a driving voltage line.

The driving transistor may further include a second driving gate electrode, and the emissive display device may further include an eleventh transistor including a first electrode electrically connected to the overlapping electrode voltage line and a second electrode electrically connected to the second driving gate electrode.

The second electrode of the eleventh transistor may be electrically connected to one or more second driving gate electrodes.

A gate electrode of the fifth transistor, a gate electrode of the ninth transistor, and a gate electrode of the eleventh transistor may be electrically connected to a fourth scan line.

The fourth scan line may transfer a gate-on voltage during a compensation period.

The emissive display device may further include a sixth transistor including a first electrode electrically connected to a driving voltage line and a second electrode electrically connected to the first electrode of the driving transistor, and a seventh transistor including a first electrode electrically connected to the second electrode of the driving transistor and a second electrode electrically connected to the anode of the light emitting diode.

The emissive display device may further include a tenth transistor that includes a first electrode electrically connected to the second driving gate electrode and a second electrode electrically connected to the anode of the light emitting diode.

The cathode of the light emitting diode may be electrically connected to a driving low voltage line, and the emissive display device may further include an eighth transistor including a first electrode electrically connected to at least one of an initializing voltage line and the driving low voltage line and a second electrode electrically connected to the anode of the light emitting diode.

The emissive display device may further include a third transistor that includes a first electrode electrically connected to at least one of the reference voltage line and the driving voltage line, and a second electrode electrically connected to the second electrode of the second transistor and the first transfer electrode, and a fourth transistor including a first electrode electrically connected to the reference voltage line, and a second electrode electrically connected to the driving gate electrode and the second transfer electrode.

An embodiment provides an emissive display device that may include a driving transistor including a first electrode, a second electrode, and a driving gate electrode, a second transistor including a first electrode electrically connected to a data line, a transfer capacitor including a first transfer electrode electrically connected to a second electrode of the second transistor and a second transfer electrode electrically connected to the driving gate electrode, a fifth transistor electrically connecting the second electrode of the driving transistor and the driving gate electrode, a ninth transistor including a second electrode electrically connected to the first electrode of the driving transistor, and a light emitting diode including an anode and a cathode receiving an output current outputted to the second electrode of the driving transistor.

A first electrode of the ninth transistor may be electrically connected to at least one of a compensation voltage line and a driving voltage line.

The driving transistor may further include a second driving gate electrode, and the emissive display device may further include an eleventh transistor including a first electrode electrically connected to the overlapping electrode voltage line and a second electrode electrically connected to the second driving gate electrode.

The second electrode of the eleventh transistor may be electrically connected to one or more second driving gate electrodes.

A gate electrode of the fifth transistor, a gate electrode of the ninth transistor, and a gate electrode of the eleventh transistor may be electrically connected to a fourth scan line.

The fourth scan line may transfer a gate-on voltage during a compensation period.

The emissive display device may further include a sixth transistor including a first electrode electrically connected to a driving voltage line and a second electrode electrically connected to the first electrode of the driving transistor, and a seventh transistor including a first electrode electrically connected to the second electrode of the driving transistor and a second electrode electrically connected to the anode of the light emitting diode.

The emissive display device may further include a tenth transistor including a first electrode electrically connected to the second driving gate electrode and a second electrode electrically connected to the anode of the light emitting diode.

The cathode of the light emitting diode may be electrically connected to a driving low voltage line, and the emissive display device further includes an eighth transistor including a first electrode electrically connected to at least one of an initializing voltage line and the driving low voltage line, and a second electrode electrically connected to the anode of the light emitting diode.

The emissive display device may further include a third transistor that includes a first electrode electrically connected to at least one of the reference voltage line and the driving voltage line, and a second electrode electrically connected to the second electrode of the second transistor and the first transfer electrode, and a fourth transistor including a first electrode electrically connected to the reference voltage line, and a second electrode electrically connected to the driving gate electrode and the second transfer electrode.

According to embodiments, it may be possible to provide an emissive display device including a pixel that performs compensation and operates in a new way by providing a novel pixel structure in which a driving transistor may be an n-type transistor.

DETAILED DESCRIPTION OF THE EMBODIMENTS

Figure 1:
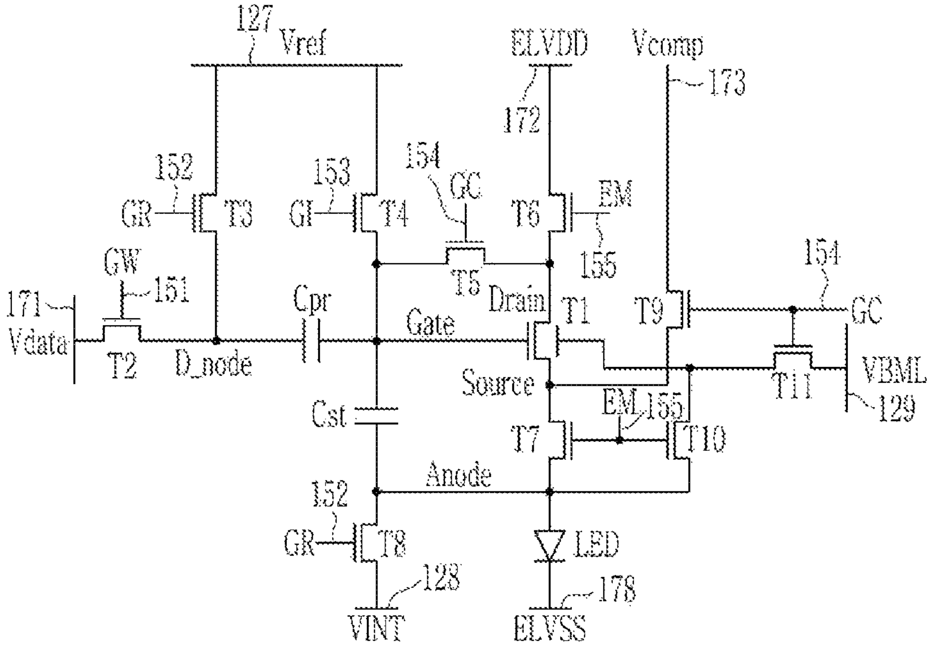
FIG. 1 schematically illustrates a circuit diagram of a pixel included in an emissive display device according to an embodiment.

The disclosure will be described more fully hereinafter with reference to the accompanying drawings, in which embodiments of the disclosure are shown. As those skilled in the art would realize, the described embodiments may be modified in various different ways, all without departing from the spirit or scope of the disclosure.

To clearly describe the disclosure, parts that are irrelevant to the description are omitted, and like numerals refer to like or similar constituent elements throughout the specification.

In the drawings, the thicknesses of layers, films, panels, regions, etc., may be exaggerated for clarity.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean any combination including "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean any combination including "A, B, or A and B."

It will be understood that when an element such as a layer, film, region, plate, etc. is referred to as being "on" another element, it can be directly on the other element or intervening elements may also be present. In contrast, when an element is referred to as being "directly on" another element, there may be no intervening elements present. Further, in the specification, the word "on" or "above" means positioned on or below the object portion, and does not necessarily mean positioned on the upper side of the object portion based on a gravitational direction.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Further, throughout the specification, the phrase "in plan view" means when an object portion is viewed from above, and the phrase "in cross-sectional view" means when a cross-section taken by vertically cutting an object portion is viewed from the side.

In the specification, "connected" may mean not only that two or more components are directly connected, but also that two or more components may be connected indirectly through other components. It will be understood that the terms "connected to" or "coupled to" may include a physical or electrical connection or coupling.

Throughout the specification, when it is said that a portion of a wire, layer, film, region, plate, component, etc., "extends in a first direction" or "a second direction," this does not indicate only a straight shape extending straight in the corresponding direction, and indicates a structure that generally extends along the first direction or the second direction, and it includes a structure that is bent at a portion, has a zigzag structure, or extends while including a curved structure.

The terms "overlap," "overlapped," "overlapping," and the like mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

An electronic device (e.g., a mobile phone, TV, monitor, notebook computer, etc.) including a display device, a display panel, etc. described in the specification, or an electronic device including a display device and a display panel manufactured by the manufacturing method described in the specification, are not excluded from the scope of the specification.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, a circuit structure of a pixel including an n-type transistor as a driving transistor will be described with reference to FIG. 1.

FIG. 1 schematically illustrates a circuit diagram of a pixel included in an emissive display device according to an embodiment.

A pixel according to FIG. 1 may include multiple transistors T1, T2, T3, T4, T5, T6, T7, T8, T9, T10, and T11, a storage capacitor Cst, a transfer capacitor Cpr and a light emitting diode LED which are connected to wires 127, 128, 129, 151, 152, 153, 154, 155, 171, 172, 173, and 178. Herein, the transistors and the capacitor excluding the light emitting diode LED may constitute a pixel circuit unit, and a pixel may include the pixel circuit unit and the light emitting diode. In an embodiment of FIG. 1, the transistors T1, T2, T3, T4, T5, T6, T7, T8, T9, T10, and T11 may all be classified as n-type transistors. In an embodiment, the n-type transistor may be formed as an oxide semiconductor transistor including an oxide semiconductor. The n-type transistor may be a transistor that is turned on in case that a relatively high voltage of a gate electrode is applied.

Multiple wires 127, 128, 129, 151, 152, 153, 154, 155, 171, 172, 173, and 178 may be connected to a pixel PX. The wires may include a reference voltage line 127, an initialization voltage line 128, an overlapping electrode voltage line 129, a first scan line 151, a second scan line 152, a third scan line 153, a fourth scan line 154, a first emission control line 155, a data line 171, a driving voltage line 172, a compensation voltage line 173, and a driving low voltage line 178 (hereinafter also referred to as a common voltage line).

The first scan line 151 may transfer a first scan signal GW to the second transistor T2, the second scan line 152 may transfer a second scan signal GR to the third transistor T3 and the eighth transistor T8, the third scan line 153 may transfer a third scan signal GI to the fourth transistor T4, the fourth scan line 154 may transfer a fourth scan signal GC to the fifth transistor T5, the ninth transistor T9, and the eleventh transistor T11, and the first emission control line 155 may transfer a first emission signal EM to the sixth transistor T6, the seventh transistor T7, and the tenth transistor T1.

The data line 171 may be a line that transfers the data voltage Vdata generated by the data driver (not illustrated), and accordingly, a magnitude of the emission current transferred to the light emitting diode LED may be changed, so that luminance of the light emitting diode LED may also be changed. The driving voltage line 172 may apply a driving voltage ELVDD, and the driving low voltage line 178 may apply a driving low voltage ELVSS. The reference voltage line 127 may transfer a reference voltage Vref, and the initialization voltage line 128 may transfer an initialization voltage VINT. The overlapping electrode voltage line 129 may transfer an overlapping electrode voltage VBML applied to an overlapping electrode (hereinafter also referred to as a second driving gate electrode) overlapping a channel of the driving transistor T1, and the compensation voltage line 173 may transfer a compensation voltage Vcomp to a second electrode Source of the driving transistor T1. In an embodiment, voltages applied to the driving voltage line 172, the driving low voltage line 178, the reference voltage line 127, the initialization voltage line 128, the overlapping electrode voltage line 129, and the compensation voltage line 173 may each be a constant voltage.

The driving transistor T1 (also referred to as a first transistor) may be a n-type transistor and have an oxide semiconductor (polycrystalline semiconductor) as a semiconductor layer. It may be a transistor that adjusts a magnitude of an emission current that is outputted to an electrode (hereinafter also referred to as an anode) of the light emitting diode LED depending on a magnitude of the voltage (i.e., the voltage stored in the storage capacitor Cst) of the gate electrode Gate (hereinafter also referred to as a driving gate electrode) of the driving transistor T1. Brightness of the light emitting diode LED may be adjusted depending on the magnitude of the emission current outputted to an electrode of the light emitting diode LED, and thus emission luminance of the light emitting diode LED may be adjusted depending on a data voltage Vdata applied to the pixel. For this purpose, a first electrode Drain of the driving transistor T1 may be connected to the driving voltage line 172 via the sixth transistor T6 by being positioned to receive the driving voltage ELVDD. The first electrode Drain of the driving transistor T1 may also be connected to a second electrode of the fifth transistor T5. The data voltage Vdata may be applied to the gate electrode of the driving transistor T1 through the second transistor T2 and the transfer capacitor Cpr. The second electrode Source of the driving transistor T1 may output an emission current to the light emitting diode LED, and may be connected to an electrode of the light emitting diode LED via the seventh transistor T7 (hereinafter also referred to as an output control transistor). The second electrode Source of the driving transistor T1 may also be connected to a second electrode of the ninth transistor T9. A gate electrode of the driving transistor T1 may be connected to a first electrode (hereinafter referred to as a second transfer electrode) of the transfer capacitor Cpr. Accordingly, the voltage of the gate electrode of the driving transistor T1 may change depending on a voltage stored in the transfer capacitor Cpr, and an emission current outputted by the driving transistor T1 may change accordingly. The transfer capacitor Cpr may serve to maintain a voltage of the gate electrode of the driving transistor T1 to be constant during a frame. A gate electrode of the driving transistor T1 may also be connected to the fourth transistor T4, to be initialized by receiving the reference voltage Vref. The gate electrode of the driving transistor T1 may be connected to the second electrode of the storage capacitor Cst so that the data voltage Vdata transferred to the gate electrode of the driving transistor T1 may be stored and maintained in the storage capacitor Cst for a frame. The driving transistor T1 may further include an overlapping electrode overlapping a channel positioned on the semiconductor layer, the overlapping electrode may receive the overlapping electrode voltage VBML through the eleventh transistor T11, and it may also be connected to the first electrode of the tenth transistor T10.

The second transistor T2, which may be an n-type transistor, may have an oxide semiconductor as a semiconductor layer. The second transistor T2 may be a transistor that receives the data voltage Vdata into the pixel. A gate electrode of the second transistor T2 may be connected to the first scan line 151. A first electrode of the second transistor T2 may be connected to the data line 171. A second electrode of the second transistor T2 may be connected to a second electrode of the third transistor T3 and the first electrode (hereinafter referred to as a 'first transfer electrode') of the transfer capacitor Cpr. Hereinafter, a node to which the second electrode of the second transistor T2, the second electrode of the third transistor T3, and the first electrode of the transfer capacitor Cpr may be connected is also referred to as a D node D_node. In case that the second transistor T2 is turned on by a positive voltage of the first scan signal GW transferred through the first scan line 151, the data voltage Vdata transferred through the data line 171 may be transferred to the transfer capacitor Cpr, and the data voltage Vdata may be transferred to the driving gate electrode of the driving transistor T1 through the transfer capacitor Cpr.

The third transistor T3, which may be an n-type transistor, may have an oxide semiconductor as a semiconductor layer. Since the third transistor T3 serves to transfer the reference voltage Vref to the D node D_node, the reference voltage Vref may be transferred to the second electrode of the second transistor T2 and the first electrode of the transfer capacitor Cpr. A gate electrode of the third transistor T3 may be connected to the second scan line 152, a first electrode of the third transistor T3 may be connected to the reference voltage line 127, and the second electrode of the third transistor T3 may be connected to the D node D_node and may be connected to the second electrode of the second transistor T2 and the first electrode of the transfer capacitor Cpr. The third transistor T3 may be turned on by a positive voltage of the second scan signal GR received through the second scan line 152 to transfer the reference voltage Vref to the D node D_node.

The fourth transistor T4, which may be an n-type transistor, may have an oxide semiconductor as a semiconductor layer. The fourth transistor T4 may serve to transfer the reference voltage Vref to the gate electrode of the driving transistor T1 and the second transfer electrode of the transfer capacitor Cpr. A gate electrode of the fourth transistor T4 may be connected to the third scan line 153, a first electrode of the fourth transistor T4 may be connected to the reference voltage line 127, and a second electrode of the fourth transistor T4 may be connected to the second transfer electrode of the transfer capacitor Cpr, the driving gate electrode of the driving transistor T1, the second electrode of the storage capacitor Cst, and a second electrode of the fifth transistor T5. The fourth transistor T4 may be turned on by a positive voltage of the third scan signal GI transferred through the third scan line 153, and the reference voltage Vref may be transferred to the driving gate electrode of the driving transistor T1 and the second transfer electrode of the transfer capacitor Cpr.

The fifth transistor T5, which may be an n-type transistor, may have an oxide semiconductor as a semiconductor layer. The fifth transistor T5 may electrically connect the first electrode Drain of the driving transistor T1 and the driving gate electrode of the driving transistor T1. A gate electrode of the fifth transistor T5 may be connected to the first scan line 154, and a first electrode of the fifth transistor T5 may be connected to the first electrode Drain of the driving transistor T1 and a second electrode of the sixth transistor T6. The second electrode of the fifth transistor T5 may be connected to the driving gate electrode of the driving transistor T1, the second electrode of the storage capacitor Cst, the second electrode of the fourth transistor T4, and the second transfer electrode of the transfer capacitor Cpr. The fifth transistor T5 may be turned on by a positive voltage of the fourth scan signal GC transferred through the fourth scan line 154, so as to connect the first electrode Drain of the driving transistor T1 and the driving gate electrode of the driving transistor T1.

The sixth transistor T6 and the seventh transistor T7, which may be n-type transistors, may have an oxide semiconductor as a semiconductor layer.

The sixth transistor T6 may serve to transfer the driving voltage ELVDD to the driving transistor T1. A gate electrode of the sixth transistor T6 may be connected to the first emission control line 155, a first electrode of the sixth transistor T6 may be connected to the driving voltage line 172, and the second electrode of the sixth transistor T6 may be connected to the first electrode Drain of the driving transistor T1 and the first electrode of the fifth transistor T5.

The seventh transistor T7 may serve to transfer an emission current outputted from the driving transistor T1 to the light emitting diode. A gate electrode of the seventh transistor T7 may be connected to the first emission control line 155, a first electrode of the seventh transistor T7 may be connected to the second electrode Source of the driving transistor T1 and the second electrode of the ninth transistor T9, and a second electrode of the seventh transistor T7 may be connected to an electrode of the light emitting diode LED, the first electrode of the storage capacitor Cst, a second electrode of the eighth transistor T8, and a second electrode of the tenth transistor T10.

The eighth transistor T8, which may be an n-type transistor, may have an oxide semiconductor as a semiconductor layer. The eighth transistor T8 may serve to initialize an electrode of the light emitting diode LED. Hereinafter, the eighth transistor T8 is also referred to as a light emitting diode initialization transistor. A gate electrode of the eighth transistor T8 may be connected to the second scan line 152, the second electrode of the eighth transistor T8 may be connected to an electrode of the light emitting diode LED, the first electrode of the storage capacitor Cst, the second electrode of the seventh transistor T7, and the second electrode of the tenth transistor T10, and a first electrode of the eighth transistor T8 may be connected to the initialization voltage line 128. In case that the eighth transistor T8 is turned on by a positive voltage of the second scan signal GR flowing through the second scan line 152, the initialization voltage VINT may be applied to an electrode of the light emitting diode LED to be initialized.

The ninth transistor T9, which may be an n-type transistor, may have an oxide semiconductor as a semiconductor layer. The ninth transistor T9 may serve to transfer the compensation voltage Vcomp to the second electrode Source of the driving transistor T1. Hereinafter, the ninth transistor T9 is also referred to as a compensation voltage transfer transistor. A gate electrode of the ninth transistor T9 may be connected to the fourth scan line 154, a second electrode of the ninth transistor T9 may be connected to the second electrode Source of the driving transistor T1 and the first electrode of the seventh transistor T7, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the second electrode Source of the driving transistor T1.

The tenth transistor T10, which may be an n-type transistor, may have an oxide semiconductor as a semiconductor layer. The tenth transistor T10 may serve to maintain an electrode of the light emitting diode LED and the overlapping electrode (the second driving gate electrode) of the driving transistor T1 at the same voltage during the emission period. A gate electrode of the tenth transistor T10 may be connected to the first emission control line 155, the second electrode of the tenth transistor T10 may be connected to an electrode of the light emitting diode LED, the second electrode of the seventh transistor T7, and the first electrode of the storage capacitor Cst, and a first electrode of the tenth transistor T10 may be connected to the overlapping electrode of the driving transistor T1 and the second electrode of the eleventh transistor T11. The tenth transistor T10 may be turned on during the emission period to electrically connect the overlapping electrode (the second driving gate electrode) of the driving transistor T1 and an electrode of the light emitting diode LED, and since the seventh transistor T7 may be turned on during the emission period, the voltage of an electrode (anode) of the light emitting diode LED may be the same as the voltage of the second electrode Source of the driving transistor T1. Accordingly, during the emission period, the tenth transistor T10 may cause a voltage of the overlapping electrode of the driving transistor T1 to have a voltage value of the second electrode Source of the driving transistor T1.

Figure 11:
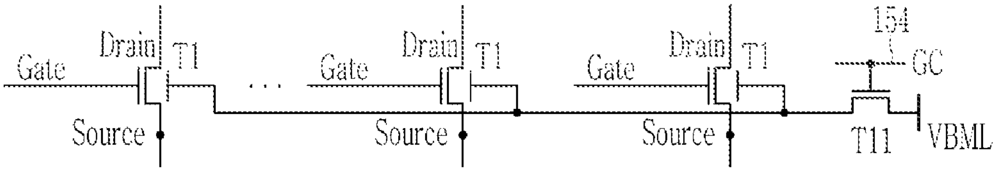
FIG. 11 schematically illustrates a modified structure of an eleventh transistor in an embodiment of FIG. 1.

The eleventh transistor T11, which may be an n-type transistor, may have an oxide semiconductor as a semiconductor layer. The eleventh transistor T11 may serve to transfer the overlapping electrode voltage VBML to the overlapping electrode (the second driving gate electrode) of the driving transistor T1. Hereinafter, the eleventh transistor T11 is also referred to as a superimposed voltage transfer transistor. The gate electrode of the eleventh transistor T11 may be connected to the fourth scan line 154, the second electrode of the eleventh transistor T11 may be connected to the overlapping electrode (the second driving gate electrode) of the driving transistor T1 and the first electrode of the tenth transistor T10, and the first electrode of the eleventh transistor T11 may be connected to the overlapping electrode voltage line 129. In case that the eleventh transistor T11 is turned on by a positive voltage of the fourth scan signal GC flowing through the fourth scan line 154, the overlapping electrode voltage VBML may be applied to the overlapping electrode (the second driving gate electrode) of the driving transistor T1. The eleventh transistor T11 may be included in each pixel circuit unit included in the pixel, and also according to an embodiment, as illustrated in FIG. 11, one eleventh transistor T11 may be formed across multiple pixels or multiple pixel circuit units. One eleventh transistor T11 may be formed in one row of the eleventh transistor T11 formed to correspond to the pixels.

Referring to FIG. 1, only the driving transistor T1 may include the overlapping electrode overlapping the channel included in the semiconductor layer.

At least one of the other transistors T2, T3, T4, T5, T6, T7, T8, T9, T10, and T11 may have an overlapping electrode overlapping a channel included in the semiconductor layer. In all the transistors T2, T3, T4, T5, T6, T7, T8, and T9 except the driving transistor T1, each overlapping electrode may be electrically connected to each gate electrode, and each overlapping electrode may serve as another gate electrode (hereinafter also referred to as second gate electrode).

In the above description, all the transistors T1, T2, T3, T4, T5, T6, T7, T8, T9, T10, and T11 may be formed as n-type transistors and an oxide semiconductor may be used for the semiconductor layer, but what may be necessary for the transistors is just an n-type transistor, and a silicon semiconductor may also be used for the semiconductor layer.

The first transfer electrode of the transfer capacitor Cpr may be connected to the D node D_node to be connected to the second electrode of the second transistor T2 and the second electrode of the third transistor T3, and the second transfer electrode may be connected to the driving gate electrode Gate of the driving transistor T1, the second electrode of the storage capacitor Cst, the second electrode of the fourth transistor T4, and the second electrode of the fifth transistor T5.

The first electrode (also referred to as a first storage electrode) of the storage capacitor Cst may be connected to the second electrode of the eighth transistor T8, the second electrode of the seventh transistor T7, the second electrode of the tenth transistor T10, and an electrode (anode) of the light emitting diode (LED), and the second electrode (also referred to as the second sustain electrode) may be connected to the gate electrode of the driving transistor T1, the second electrode of the fourth transistor T4, the second electrode of the fifth transistor T5, and the second transfer electrode of the transfer capacitor Cpr.

A first electrode (anode) of the light emitting diode LED may be connected to the second electrode of the seventh transistor T7, the second electrode of the eighth transistor T8, the second electrode of the tenth transistor T10, and the first electrode of the storage capacitor Cst, and a second electrode (cathode) of the light emitting diode LED may be connected to the driving low voltage line 178 to receive the driving low voltage ELVSS.

It has been described that a pixel PX includes 11 transistors T1 to T11, two capacitors (a transfer capacitor Cpr and a storage capacitor Cst), and a light emitting diode LED, but the disclosure is not limited thereto, and in case that the eleventh transistor T11 is formed in common as shown in FIG. 11 to be described later, a pixel PX may include ten transistors T1 to T10, two capacitors (a transfer capacitor Cpr and a storage capacitor Cst), and a light emitting diode LED. Various modifications will be described below with reference to FIG. 7 to FIG. 14.

In the above, a circuit structure of a pixel according to an embodiment has been described with reference to FIG. 1.

Hereinafter, a waveform of a signal applied to the pixel of FIG. 1 and an operation of the pixel depending on the waveform will be described with reference to FIG. 2 to FIG. 6.

Figure 2:
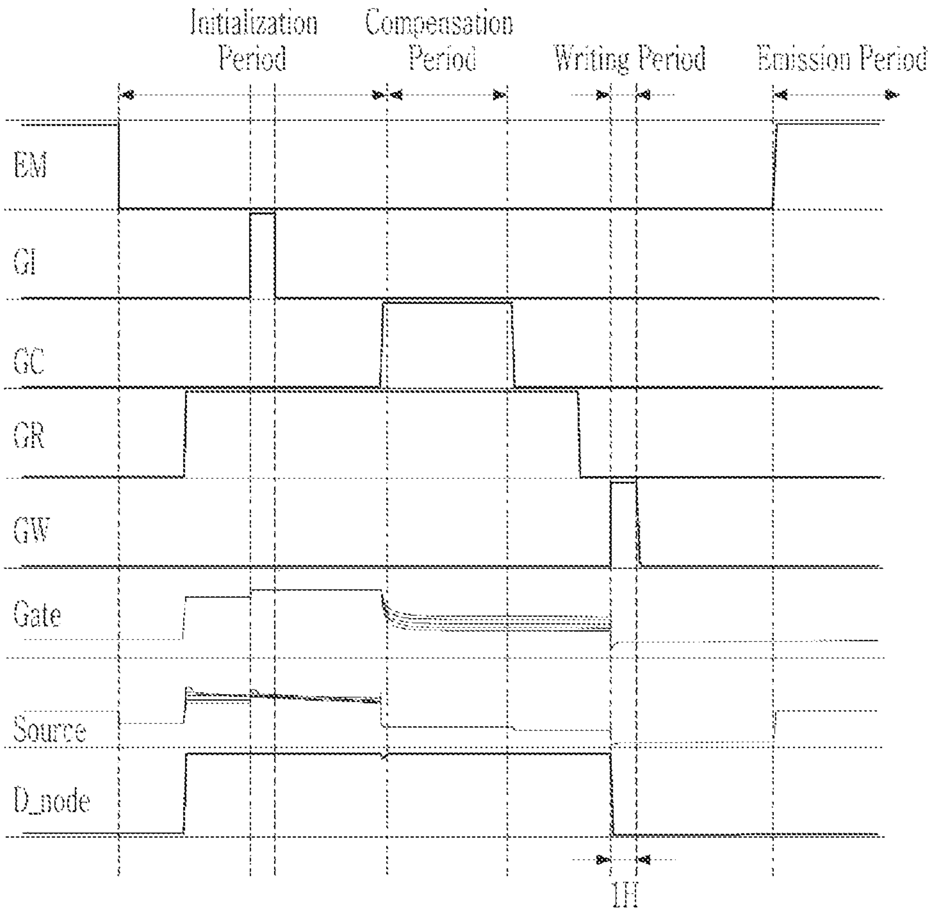
FIG. 2 schematically illustrates a waveform diagram showing a signal applied to the pixel of FIG. 1.

FIG. 2 schematically illustrates a waveform diagram showing a signal applied to the pixel of FIG. 1, and FIG. 3 to FIG. 6 each schematically illustrate a view for describing an operation of the pixel of FIG. 1 for each period based on the signal of FIG. 2.

Referring to FIG. 2, in case that a signal applied to a pixel is divided into periods, it may be divided into an initialization period, a compensation period, a writing period, and an emission period. In an embodiment, an n-type transistor may be used, and thus a high voltage may be a gate-on voltage and a low voltage may be a gate-off voltage in FIG. 2.

First, referring to FIG. 2, the emission period may be a period in which the light emitting diode LED emits light, and an initialization period, a compensation period, and a writing period may be sequentially located between adjacent emission periods. During the emission period, a gate-on voltage (a high level voltage) may be applied to the first light emitting signal EM to turn on the sixth transistor T6 and the seventh transistor T7. In case that the sixth transistor T6 is turned on so that the driving voltage ELVDD is transferred to the driving transistor T1, an output current may be generated depending on the voltage (a voltage of the second electrode of the storage capacitor Cst) of the gate electrode of the driving transistor T1. The output current of the driving transistor T1 may be transmitted to the light emitting diode LED through the turned-on seventh transistor T7, to enable the light emitting diode LED to emit light. In FIG. 2, the emission period during which the first emission signal EM applies the gate-on voltage (high level voltage) is long is not illustrated, but the emission period may actually have the longest time. The emission period is simply illustrated in FIG. 2 without specific explanation because only the above simple operation may be performed.

Referring to FIG. 2, a voltage change of the driving gate electrode Gate and the second electrode Source of the driving transistor T1 and a voltage change of the D node D_node are also illustrated during the initialization period.

Referring to FIG. 2, as the first emission signal EM may be changed to a gate-off voltage (a low level voltage), the emission period ends and the initialization period may be entered.

Figure 3:
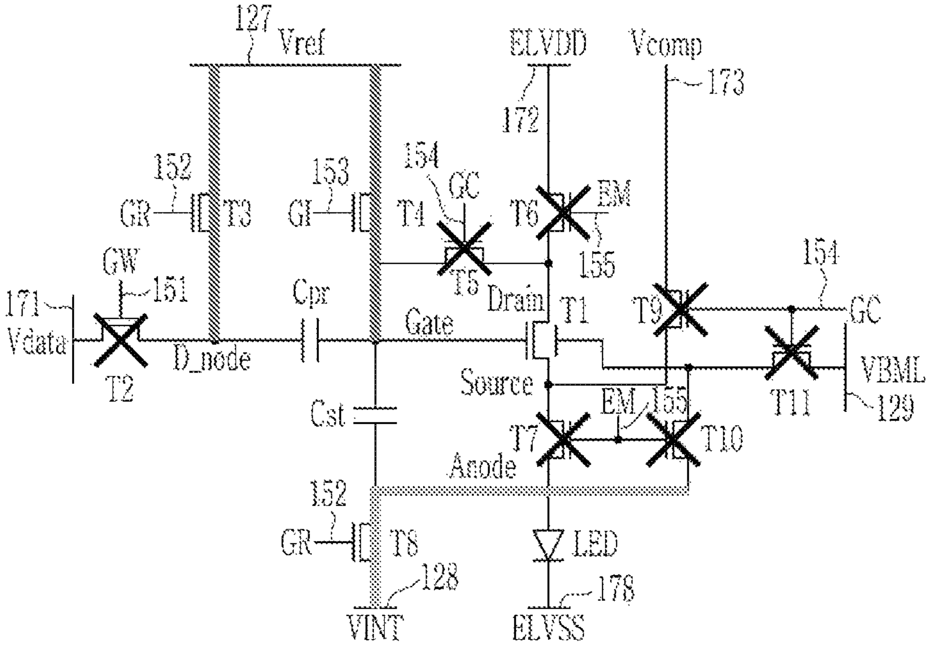
FIG. 3 to FIG. 6 each schematically illustrate a view for describing an operation of the pixel of FIG. 1 for each period based on the signal of FIG. 2.

The initialization period will be described with reference to FIG. 2 and FIG. 3 as follows.

The initialization period may be a period in which the gate-on voltage (high level voltage) may be applied to the second scan signal GR and the third scan signal GI, and referring to FIG. 2, first, the second scan signal GR may be changed to the gate-on voltage (high level voltage), and the third scan signal GI may be changed to the gate-on voltage (high level voltage). Referring to FIG. 2, a period during which the third scan signal GI maintains the gate-on voltage (the high level voltage) may be shorter than the period in which the second scan signal GR maintains the gate-on voltage (the high level voltage), and the second scan signal GR maintains the gate-on voltage (the high level voltage) until a subsequent compensation period. The first light emitting signal EM, the first scan signal GW, and the fourth scan signal GC may maintain the gate-off voltage (the low level voltage).

An operation of a pixel during an initialization period will be described with reference to FIG. 3. A transistor marked with an X in FIG. 3 shows a turned-off state, and a bold line in a circuit diagram shows that it is connected through a corresponding wire and transistor. This method of illustration is the same in FIG. 4 to FIG. 6.

During the initialization period, first, the third transistor T3 and the eighth transistor T8 may be turned on by the gate-on voltage of the second scan signal GR. A voltage value of the D node D node including the first transfer electrode of the transfer capacitor Cpr may be increased by the third transistor T3 may be initialized by changing to the reference voltage Vref, and a voltage value of the first electrode of the storage capacitor Cst and an electrode (anode) of the light emitting diode LED may be initialized to the initialization voltage VINT by the eighth transistor T8. Thereafter, the fourth transistor T4 may be turned on while the gate-on voltage may be applied to the third scan signal GI. The fourth transistor T4 may be turned on to initialize a voltage of the driving gate electrode Gate of the driving transistor T1 to the reference voltage Vref. The reference voltage Vref may have a high voltage so that the driving transistor T1 has a turned-on state, opposite ends of the transfer capacitor Cpr have the reference voltage Vref, and opposite ends of the storage capacitor Cst may have the reference voltage Vref and the initialization voltage VINT.

As the fourth scan signal GC may be changed to the gate-on voltage (the high level voltage), it enters the compensation section, and the second scan signal GR may be maintained at the gate-on voltage, and other signals (the first emission signal EM, the first scan signal GW, and the third scan signal GI) may have the gate-off voltage.

Figure 4:
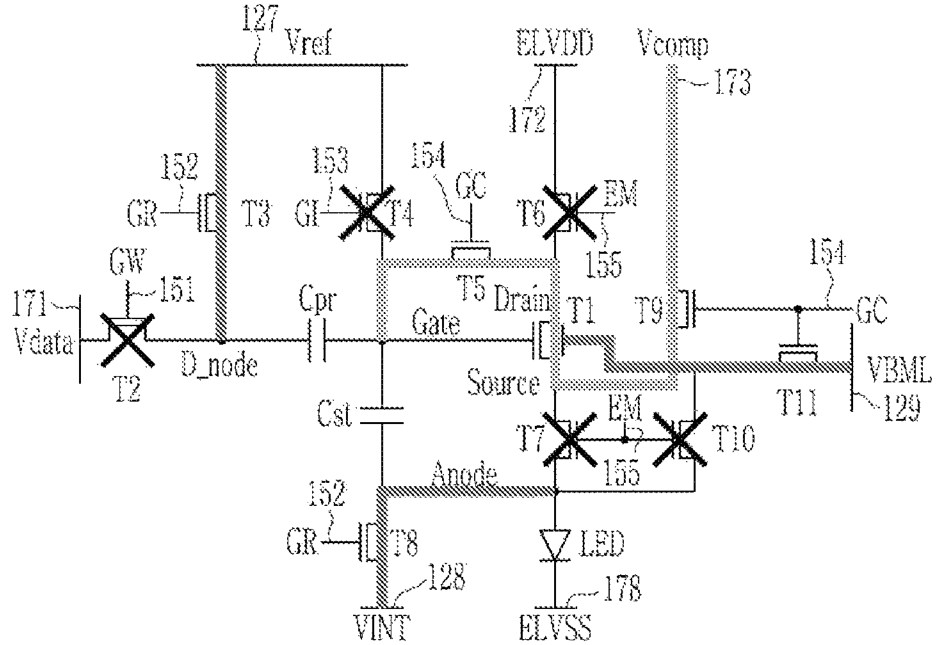

Referring to FIG. 4, the fifth transistor T5, the ninth transistor T9, and the eleventh transistor T11 may be turned on by the fourth scan signal GC in a state in which the third transistor T3 and the eighth transistor T8 may be turned on by the second scan signal GR. The driving gate electrode Gate and the first electrode Drain of the driving transistor T1 may be connected to each other by the fifth transistor T5, the compensation voltage Vcomp may be applied to the second electrode Source of the driving transistor T1 by the ninth transistor T9, and the overlapping electrode voltage VBML may be applied to the overlapping electrode (the second driving gate electrode) of the driving transistor T1 by the eleventh transistor T11. Herein, the overlapping electrode voltage VBML may have a high voltage, and a threshold voltage of the driving transistor T1 may be shifted in a direction depending on a magnitude of the overlapping electrode voltage VBML, and the shifted threshold voltage may be maintained. For example, it may be possible to prevent a case in which the threshold voltage of the driving transistor T1 is shifted to not be turned on by the reference voltage Vref by using the overlapping electrode voltage VBML, and a constant output current may be generated depending on the data voltage Vdata.

Since the driving transistor T1 may be turned on in an initialization step, the second electrode Source of the driving transistor T1 may be connected to the driving gate electrode Gate of the driving transistor T1, the second electrode of the storage capacitor Cst, and the second electrode of the transfer capacitor Cpr through the first electrode Drain of the driving transistor T1 and the fifth transistor T5. Voltages of the driving gate electrode Gate of the driving transistor T1 and the second electrode of the storage capacitor Cst may have a reference voltage Vref, the compensation voltage Vcomp may be applied to the second electrode Source of the driving transistor T1, and the reference voltage Vref has a higher voltage than the compensation voltage Vcomp, and thus in case that the voltage value stored in the second electrode of the storage capacitor Cst gradually decreases from the reference voltage Vref and the driving transistor T1 turns off, voltage reduction stops and a corresponding voltage value may be stored in the second electrode of the storage capacitor Cst. In case that the driving transistor T1 is turned off, a voltage of the driving gate electrode Gate may be higher than a voltage of the second electrode Source of the driving transistor T1 by a threshold voltage Vth, and thus in case that the compensation period ends, the voltage of the second electrode of the storage capacitor Cst may be higher than the compensation voltage Vcomp by the threshold voltage Vth of the driving transistor T1. A voltage of the second electrode of the storage capacitor Cst may be the same as a voltage of the driving gate electrode of the driving transistor T1, and the voltage of the driving gate electrode may be as Equation 1 below.

$$\text{Voltage of driving gate electrode} = \text{Vcomp} + Vth \quad \text{[Equation 1]}$$

During the compensation period as described above, a more uniform compensation operation may be performed as the data voltage Vdata that varies depending on a gray level may not be applied, but a constant compensation voltage Vcomp may be applied and compensated.

Referring back to FIG. 2, as the fourth scan signal GC may be changed to the gate-off voltage (the low level voltage), the compensation period ends, and thereafter, the second scan signal GR also enters the writing period while being changed to the gate-off voltage (the low level voltage). During the write period, the gate-on voltage (the high level voltage) may be applied to the first scan signal GW.

Figure 5:
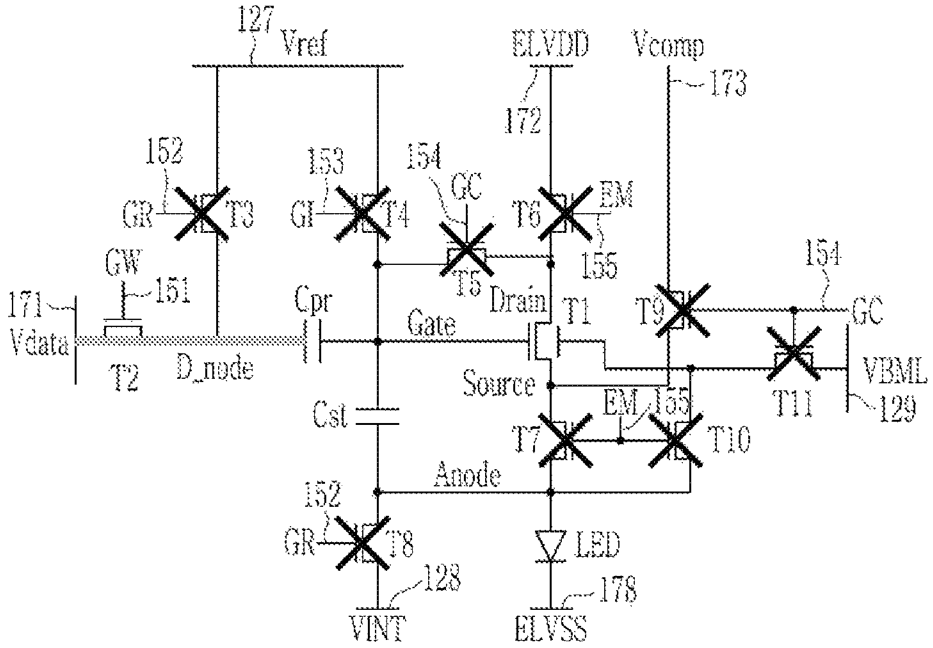

Referring to FIG. 5, as the second scan signal GR may also be changed to the gate-off voltage (the low level voltage), the third transistor T3 may be turned off so that the reference voltage Vref may no longer be transferred to the first transfer electrode and the D node D_node of the transfer capacitor Cpr. Thereafter, as the gate-on voltage (the high level voltage) may be applied to the first scan signal GW, the second transistor T2 may be turned on to transfer the data voltage Vdata to the first transfer electrode of the transfer capacitor Cpr and the D node D_node.

During the compensation period, a voltage value stored in the second transfer electrode of the transfer capacitor Cpr may be the same as in Equation 1, and during the writing period, as the voltage value of the first transfer electrode of the transfer capacitor Cpr varies, a voltage value of the second transfer electrode also changes. For example, during the compensation period, a voltage value of the first transfer electrode may be changed from the reference voltage Vref to the data voltage Vdata, and thus, a voltage value of the second transfer electrode may be changed by a ratio of a value obtained by subtracting the reference voltage Vref from the data voltage Vdata. Accordingly, the voltage value of the second transfer electrode and the voltage of the driving gate electrode after the writing period may be expressed by Equation 2 below.

$$\text{Voltage of driving gate electrode} = \text{Vref} - Vth + \alpha(\text{Vdata} - \text{Vref}) \quad \text{[Equation 2]}$$

Herein, $\alpha$ may have a value of greater than 0 and less than 1.

The threshold voltage Vth among voltages of the driving gate electrode in Equation 2 may be used to turn on the driving transistor T1, and even in case that the threshold voltage is different for each driving transistor T1, it may be compensated. In Equation 2, values other than the threshold voltage Vth may be used by the driving transistor T1 to generate an output current.

Referring back to FIG. 2, the writing period ends, and the first emission signal EM enters the emission period again while the gate-on voltage may be applied.

Figure 6:
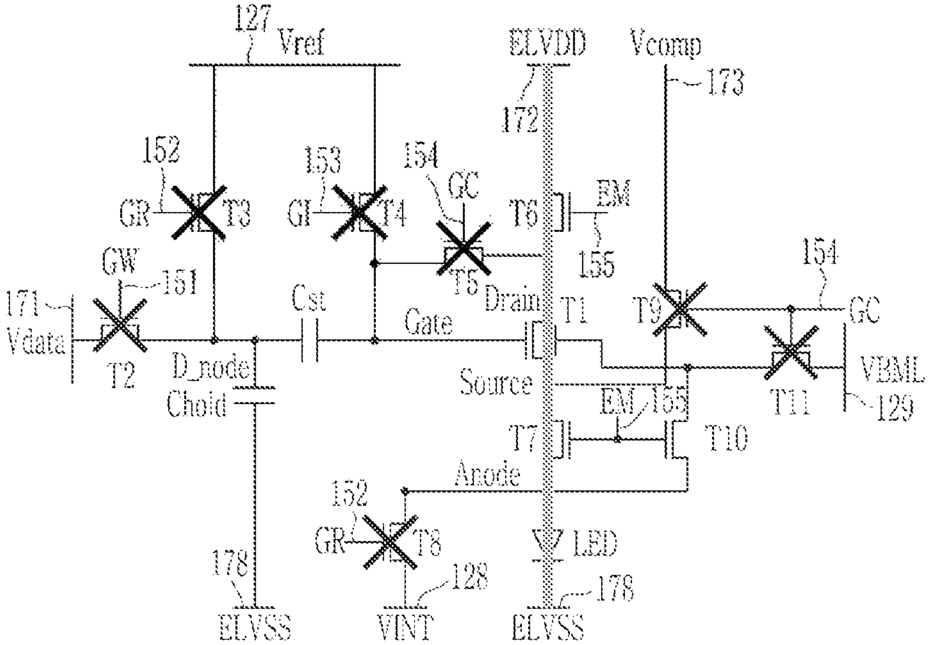

Referring to FIG. 6, the sixth transistor T6, the seventh transistor T7, and the tenth transistor T10 may be turned on by the gate-on voltage (the high level voltage) of the first emission signal EM.

In case that the sixth transistor T6 is turned on so that the driving voltage ELVDD is transferred to the driving transistor T1, an output current may be generated depending on a voltage (i.e., a voltage of Equation 2) of the driving gate electrode of the driving transistor T1. The output current of the driving transistor T1 may be transmitted to the light emitting diode LED through the turned-on seventh transistor T7, to enable the light emitting diode LED to emit light.

An electrode (anode) of the light emitting diode LED and the overlapping electrode of the driving transistor T1 may be connected by the turned-on tenth transistor T10, and the voltage of an electrode (anode) of the light emitting diode LED may be the same as the voltage of the second electrode Source of the driving transistor T1, and thus finally, the tenth transistor T10 enables a voltage of the overlapping electrode of the driving transistor T1 to have a voltage value of the second electrode Source of the driving transistor T1. As a result, the voltage of the overlapping electrode of the driving transistor T1 may be kept constant depending on the voltage value of the second electrode Source so that a channel characteristic of the driving transistor T1 may not be changed to generate a constant output current.

In the above, the circuit structure and operation of the pixel have been described with reference to FIG. 1 to FIG. 6.

Hereinafter, a modified structure of the pixel structure of FIG. 1 will be described with reference to FIG. 7 to FIG. 9.

FIG. 7 to FIG. 10 each schematically illustrate a circuit diagram of a modified pixel according to an embodiment of FIG. 1.

Figure 7:
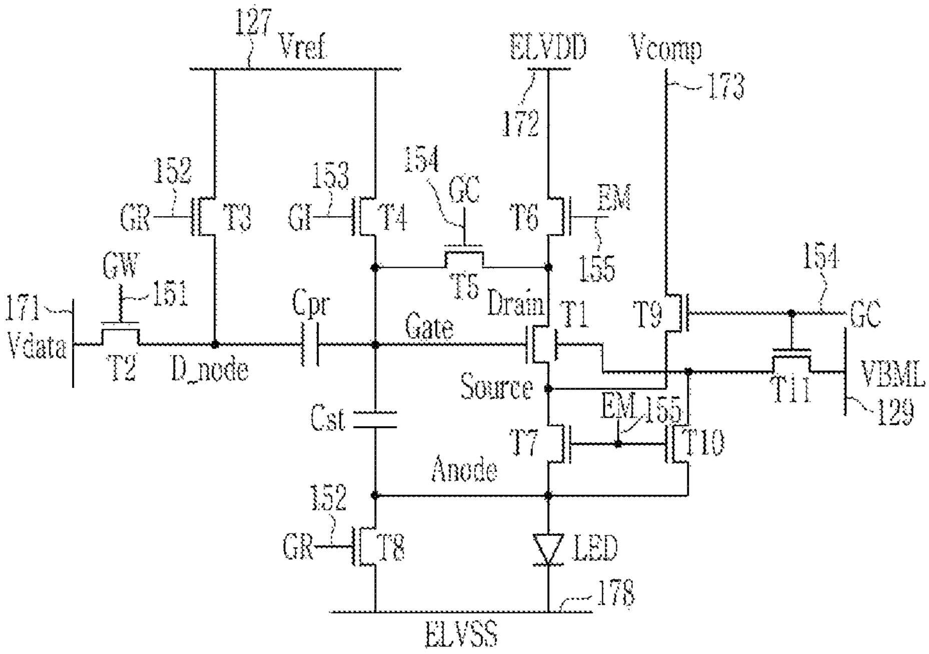
FIG. 7 to FIG. 10 each schematically illustrate a circuit diagram of a modified pixel of an embodiment of FIG. 1.

Unlike in the pixel of FIG. 1, in the pixel according to an embodiment of FIG. 7, a first electrode of the eighth transistor T8 may be connected to the driving low voltage line 178 instead of the initialization voltage line 128.

In an embodiment of FIG. 7, an electrode (anode) of the light emitting diode LED and a first electrode of the storage capacitor Cst may be initialized to the driving low voltage ELVSS during the initialization period. In an embodiment of FIG. 7, there may be an advantage that the initialization voltage line 128 may not be formed.

Figure 8:
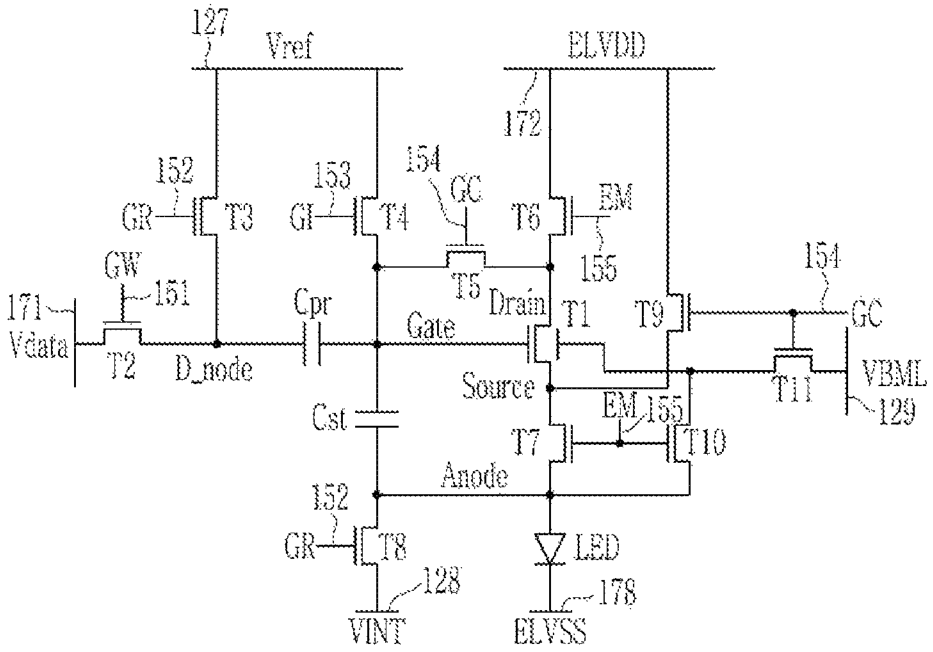

An embodiment of FIG. 8 is an embodiment in which, unlike the pixel of FIG. 1, the first electrode of the eighth transistor T8 may be connected to the driving voltage line 172 instead of the compensation voltage line 173.

In an embodiment of FIG. 8, during the compensation period, the driving voltage ELVDD may be applied to the second electrode Source of the driving transistor T1, and unlike Equation 1, a voltage of the driving gate electrode of the driving transistor T1 may be higher than the driving voltage ELVDD by the threshold voltage Vth of the driving transistor T1. The reference voltage Vref may have a higher voltage value than the driving voltage ELVDD. In an embodiment of FIG. 8, there may be an advantage that the compensation voltage line 173 may not be formed.

Figure 9:
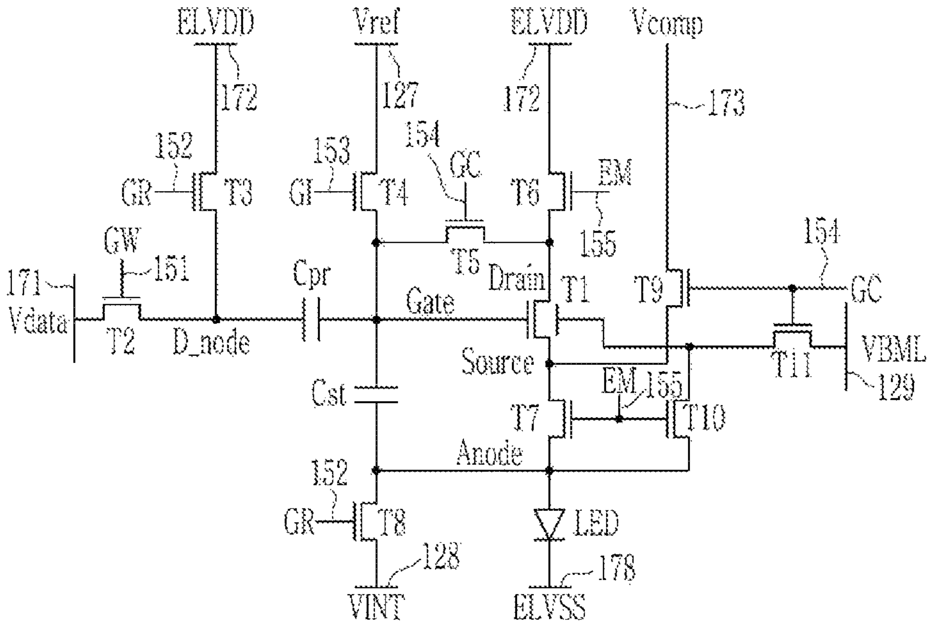
Figure 10:
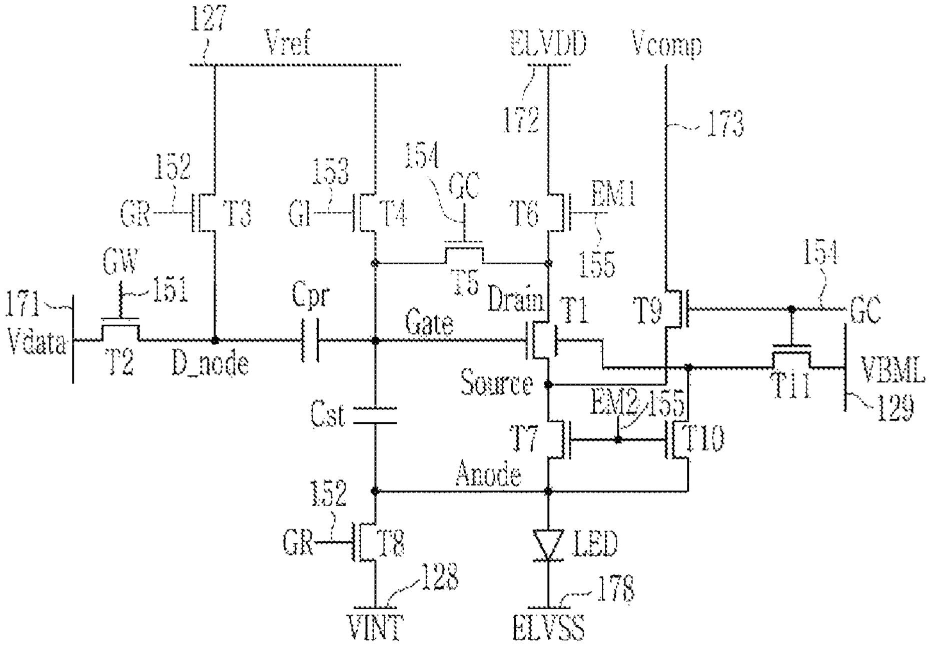

An embodiment of FIG. 9 is an embodiment in which, unlike the pixel of FIG. 1, the first electrode of the third transistor T3 may be connected to the driving voltage line 172 to receive the driving voltage ELVDD, and an embodiment of FIG. 10 is an embodiment in which, unlike the pixel of FIG. 1, the first emission signal EM may be divided into two signals EM1 and EM2 such that the emission signal EM1 applied to the sixth transistor T6 may be different from the emission signal EM2 applied to the seventh transistor T7 and the tenth transistor T10. The two emission signals EM1 and EM2 may be changed to a high voltage and a low voltage at different timings, but a gate-on voltage may be applied to both of them during the emission period.

As in the above embodiments of FIG. 7 to FIG. 10, the pixel of FIG. 1 may have various modifications in which a control signal applied to each transistor may be changed or a voltage applied to each transistor may be changed.

In the above description, an embodiment in which the eleventh transistor T11 may be included in a pixel has been described. However, according to an embodiment, a structure in which one eleventh transistor T11 is connected every multiple pixels may be provided, and an embodiment thereof will be described with reference to FIG. 11.

FIG. 11 schematically illustrates a modified structure of an eleventh transistor in an embodiment of FIG. 1.

FIG. 11 illustrates only the respective driving transistors T1 included in the pixels for convenience, and a connection structure between the overlapping electrodes of the driving transistors T1 and one eleventh transistor T11 is illustrated.

According to an embodiment of FIG. 11, the second electrode of the eleventh transistor T11 may be connected to the overlapping electrode (the second driving gate electrode) of the driving transistors T1, and in case that the gate-on voltage (the high level voltage) of the fourth scan line 154 is applied during the compensation period, the eleventh transistor T11 may be turned on to simultaneously apply the overlapping electrode voltage VBML to the overlapping electrodes of the driving transistors T1.

In an embodiment of FIG. 11, the threshold voltages of the driving transistors T1 may be shifted in the same direction by applying a same overlapping electrode voltage VBML to the overlapping electrodes of the driving transistors T1, and as a result, it may be possible to prevent a case in which the driving transistor T1 may not e turned on during the compensation period, and a constant output current may be generated depending on the data voltage Vdata during the writing period.

In an embodiment of FIG. 11, one eleventh transistor T11 may be formed for each pixel row, and the overlapping electrode voltage VBML may be simultaneously applied by one eleventh transistor T11 and to overlapping electrodes of all the driving transistors T1 included in the pixels in one row. A number of overlapping electrodes of the driving transistors T1 connected to one eleventh transistor T11 may vary according to an embodiment.

Hereinafter, an embodiment in which the fifth transistor T5 and the ninth transistor T9 may be connected to the driving transistor T1 as a modified circuit structure of the pixel of FIG. 1 will be described with reference to FIG. 12.

Figure 12:
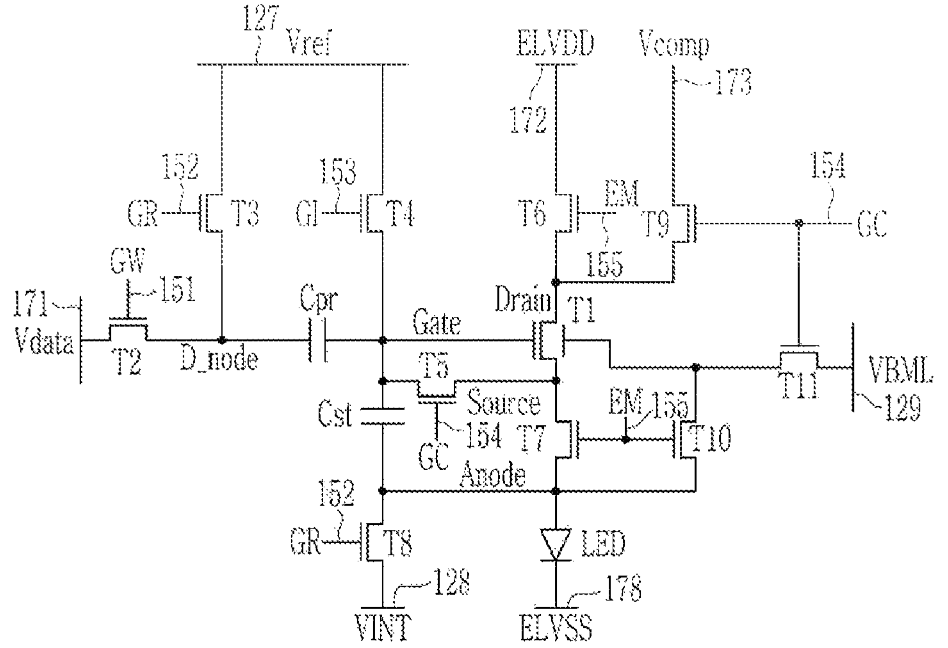
FIG. 12 schematically illustrates a circuit diagram of a pixel included in an emissive display device according to another embodiment.

FIG. 12 schematically illustrates a circuit diagram of a pixel included in an emissive display device according to another embodiment.

In the pixel according to an embodiment of FIG. 12, the fifth transistor T5 may connect the second electrode Source of the driving transistor T1 and the driving gate electrode Gate, and the ninth transistor T9 may be configured to transfer the compensation voltage Vcomp to the first electrode Drain of the driving transistor T1. For other transistors and capacitors, a same connection structure as in FIG. 1 may be provided.

Specifically, the fifth transistor T5 may electrically connect the second electrode Source of the driving transistor T1 and the driving gate electrode Gate of the driving transistor T1. A gate electrode of the fifth transistor T5 may be connected to the first scan line 154, and a first electrode of the fifth transistor T5 may be connected to the first electrode Source of the driving transistor T1 and a first electrode of the seventh transistor T7. A second electrode of the fifth transistor T5 may be connected to the driving gate electrode of the driving transistor T1, the second electrode of the fourth transistor T4, the second transfer electrode of the transfer capacitor Cpr, and the second electrode of the organic capacitor Cst. The fifth transistor T5 may be turned on by a positive voltage of the fourth scan signal GC transferred through the fourth scan line 154, so as to connect the second electrode Source of the driving transistor T1 and the driving gate electrode of the driving transistor T1.

The ninth transistor T9 may serve to transfer the compensation voltage Vcomp to the first electrode Drain of the driving transistor T1. Hereinafter, the ninth transistor T9 is also referred to as a compensation voltage transfer transistor. A gate electrode of the ninth transistor T9 may be connected to the fourth scan line 154, a second electrode of the ninth transistor T9 may be connected to the first electrode Drain of the driving transistor T1 and the second electrode of the sixth transistor T6, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the first electrode Drain of the driving transistor T1.

Hereinafter, a connection relationship between other transistors and capacitors in addition to the fifth transistor T5 and the ninth transistor T9 will be described in detail as follows.

Even in a pixel of FIG. 12, the transistors and the capacitor excluding the light emitting diode LED may constitute a pixel circuit unit, and a pixel may include the pixel circuit unit and the light emitting diode. In an embodiment of FIG. 11, the transistors T1, T2, T3, T4, T5, T6, T7, T8, T9, T10, and T11 may all be classified as n-type transistors. In the embodiment, the n-type transistor may be formed as an oxide semiconductor transistor including an oxide semiconductor. The n-type transistor may be a transistor that is turned on in case that a relatively high voltage of a gate electrode is applied.

Multiple wires 127, 127, 128, 129, 151, 152, 153, 155, 171, 172, 173, and 178 may be connected to the pixel PX of FIG. 11. The wires may include a reference voltage line 127, an initialization voltage line 128, an overlapping electrode voltage line 129, a first scan line 151, a second scan line 152, a third scan line 153, a fourth scan line 154, a first emission control line 155, a data line 171, a driving voltage line 172, a compensation voltage line 173, and a driving low voltage line 178 (hereinafter also referred to as a common voltage line).

The first scan line 151 may transfer a first scan signal GW to the second transistor T2, the second scan line 152 may transfer a second scan signal GR to the third transistor T3 and the eighth transistor T8, the third scan line 153 may transfer a third scan signal GI to the fourth transistor T4, the fourth scan line 154 may transfer a fourth scan signal GC to the fifth transistor T5, the ninth transistor T9, and the eleventh transistor T11, and the first emission control line 155 may transfer a first emission signal EM to the sixth transistor T6, the seventh transistor T7, and the tenth transistor T1.

The data line 171 may be a line that transfers the data voltage Vdata generated by the data driver (not illustrated), and accordingly, a magnitude of the emission current transferred to the light emitting diode LED may be changed, so that luminance of the light emitting diode LED may also be changed. The driving voltage line 172 may apply a driving voltage ELVDD, and the driving low voltage line 178 may apply a driving low voltage ELVSS. The reference voltage line 127 may transfer a reference voltage Vref, and the initialization voltage line 128 may transfer an initialization voltage VINT. The overlapping electrode voltage line 129 may transfer an overlapping electrode voltage VBML applied to an overlapping electrode (hereinafter also referred to as a second driving gate electrode) overlapping a channel of the driving transistor T1, and the compensation voltage line 173 may transfer a compensation voltage Vcomp to a first electrode Drain of the driving transistor T1. In an embodiment, voltages applied to the driving voltage line 172, the driving low voltage line 178, the reference voltage line 127, the initialization voltage line 128, the overlapping electrode voltage line 129, and the compensation voltage line 173 may each be a constant voltage.

The driving transistor T1 (also referred to as a first transistor) may be a transistor that adjusts a level of an emission current outputted to an electrode (anode) of the light emitting diode LED depending on a level of a voltage of the driving gate electrode (i.e., the voltage stored in the second electrode of the storage capacitor Cst). Brightness of the light emitting diode LED may be adjusted depending on the magnitude of the emission current outputted to an electrode of the light emitting diode LED, and thus emission luminance of the light emitting diode LED may be adjusted depending on a data voltage Vdata applied to the pixel. For this purpose, the first electrode Drain of the driving transistor T1 may be connected to the driving voltage line 172 via the sixth transistor T6 by being positioned to receive the driving voltage ELVDD. The first electrode Drain of the driving transistor may also be connected to a second electrode of the ninth transistor T9 to receive the compensation voltage Vcomp. The data voltage Vdata may be applied to the driving gate electrode of the driving transistor T1 through the second transistor T2 and the transfer capacitor Cpr. The second electrode Source of the driving transistor T1 may output an emission current to the light emitting diode LED, and may be connected to an electrode (anode) of the light emitting diode LED via the seventh transistor T7 (an output control transistor). The second electrode Source of the driving transistor T1 may also be connected to the first electrode of the fifth transistor T5. The gate electrode of the driving transistor T1 may be connected to the second transfer electrode of the transfer capacitor Cpr. Accordingly, the voltage of the driving gate electrode of the driving transistor T1 may change depending on a voltage stored in the transfer capacitor Cpr, and an emission current outputted by the driving transistor T1 may change accordingly. The transfer capacitor Cpr may serve to maintain a voltage of the driving gate electrode of the driving transistor T1 to be constant during a frame. The driving gate electrode of the driving transistor T1 may also be connected to the fourth transistor T4, to be initialized by receiving the reference voltage Vref. The gate electrode of the driving transistor T1 may be connected to the second electrode of the storage capacitor Cst so that the data voltage Vdata transferred to the gate electrode of the driving transistor T1 may be stored and maintained in the storage capacitor Cst for a frame. The driving transistor T1 may further include an overlapping electrode overlapping a channel positioned on the semiconductor layer, the overlapping electrode may receive the overlapping electrode voltage VBML through the eleventh transistor T11, and it may also be connected to the first electrode of the tenth transistor T10.

The second transistor T2 may be a transistor that receives the data voltage Vdata into the pixel. A gate electrode of the second transistor T2 may be connected to the first scan line 151. A first electrode of the second transistor T2 may be connected to the data line 171. The second electrode of the second transistor T2 may be connected to the D node D_node, and may be connected to the second electrode of the third transistor T3 and the first transfer electrode of the transfer capacitor Cpr. In case that the second transistor T2 is turned on by a positive voltage of the first scan signal GW transferred through the first scan line 151, the data voltage Vdata transferred through the data line 171 may be transferred to the transfer capacitor Cpr, and the data voltage Vdata may be transferred to the driving gate electrode of the driving transistor T1 through the transfer capacitor Cpr.

The third transistor T3 may serve to transfer the reference voltage Vref to the D node D_node, so the reference voltage Vref may be transferred to the second electrode of the second transistor T2 and the first electrode of the transfer capacitor Cpr. The gate electrode of the third transistor T3 may be connected to the second scan line 152, a first electrode of the third transistor T3 may be connected to the reference voltage line 127, and the second electrode of the third transistor T3 may be connected to the D node D_node and may be connected to the second electrode of the second transistor T2 and the first electrode of the transfer capacitor Cpr. The third transistor T3 may be turned on by a positive voltage of the second scan signal GR received through the second scan line 152 to transfer the reference voltage Vref to the D node D node.

The fourth transistor T4 may serve to transfer the reference voltage Vref to the driving gate electrode of the driving transistor T1 and the second transfer electrode of the transfer capacitor Cpr. A gate electrode of the fourth transistor T4 may be connected to the third scan line 153, a first electrode of the fourth transistor T4 may be connected to the reference voltage line 127, and a second electrode of the fourth transistor T4 may be connected to the second transfer electrode of the transfer capacitor Cpr, the driving gate electrode of the driving transistor T1, the second electrode of the storage capacitor Cst, and a second electrode of the fifth transistor T5. The fourth transistor T4 may be turned on by a positive voltage of the third scan signal GI transferred through the third scan line 153, and the reference voltage Vref may be transferred to the driving gate electrode of the driving transistor T1 and the second transfer electrode of the transfer capacitor Cpr.

The fifth transistor T5 may electrically connect the second electrode Source of the driving transistor T1 and the driving gate electrode Gate of the driving transistor T1. A gate electrode of the fifth transistor T5 may be connected to the first scan line 154, and a first electrode of the fifth transistor T5 may be connected to the first electrode Source of the driving transistor T1 and a first electrode of the seventh transistor T7. The second electrode of the fifth transistor T5 may be connected to the driving gate electrode of the driving transistor T1, the second electrode of the storage capacitor Cst, the second electrode of the fourth transistor T4, and the second transfer electrode of the transfer capacitor Cpr. The fifth transistor T5 may be turned on by a positive voltage of the fourth scan signal GC transferred through the fourth scan line 154, so as to connect the second electrode Source of the driving transistor T1 and the driving gate electrode of the driving transistor T1.

The sixth transistor T6 may serve to transfer the driving voltage ELVDD to the driving transistor T1. A gate electrode of the sixth transistor T6 may be connected to the first emission control line 155, a first electrode of the sixth transistor T6 may be connected to the driving voltage line 172, and the second electrode of the sixth transistor T6 may be connected to the first electrode Drain of the driving transistor T1 and the second electrode of the ninth transistor T9.

The seventh transistor T7 may serve to transfer an emission current outputted from the driving transistor T1 to the light emitting diode. The gate electrode of the seventh transistor T7 may be connected to the first light emission control line 155, the first electrode of the seventh transistor T7 may be connected to the second electrode Source of the driving transistor T1 and the first electrode of the fifth transistor T5, and the second electrode of the seventh transistor T7 may be connected to an electrode of the light emitting diode LED, the first electrode of the storage capacitor Cst, the second electrode of the eighth transistor T8, and the second electrode of the tenth transistor T10.

The eighth transistor T8 may serve to initialize an electrode of the light emitting diode LED. Hereinafter, the eighth transistor T8 is also referred to as a light emitting diode initialization transistor. A gate electrode of the eighth transistor T8 may be connected to the second scan line 152, the second electrode of the eighth transistor T8 may be connected to an electrode of the light emitting diode LED, the first electrode of the storage capacitor Cst, the second electrode of the seventh transistor T7, and the second electrode of the tenth transistor T10, and a first electrode of the eighth transistor T8 may be connected to the initialization voltage line 128. In case that the eighth transistor T8 is turned on by a positive voltage of the second scan signal GR flowing through the second scan line 152, the initialization voltage VINT may be applied to an electrode of the light emitting diode LED to be initialized.

The ninth transistor T9 may serve to transfer the compensation voltage Vcomp to the first electrode Drain of the driving transistor T1. A gate electrode of the ninth transistor T9 may be connected to the fourth scan line 154, a second electrode of the ninth transistor T9 may be connected to the first electrode Drain of the driving transistor T1 and the second electrode of the sixth transistor T6, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the first electrode Drain of the driving transistor T1.

The tenth transistor T10 may serve to maintain an electrode of the light emitting diode LED and the overlapping electrode (the second driving gate electrode) of the driving transistor T1 at the same voltage during the emission period. A gate electrode of the tenth transistor T10 may be connected to the first emission control line 155, the second electrode of the tenth transistor T10 may be connected to an electrode of the light emitting diode LED, the second electrode of the seventh transistor T7, and the first electrode of the storage capacitor Cst, and a first electrode of the tenth transistor T10 may be connected to the overlapping electrode of the driving transistor T1 and the second electrode of the eleventh transistor T11. The tenth transistor T10 may be turned on during the emission period to electrically connect the overlapping electrode (the second driving gate electrode) of the driving transistor T1 and an electrode of the light emitting diode LED), and since the seventh transistor T7 may be turned on during the emission period, the voltage of an electrode (anode) of the light emitting diode LED may be the same as the voltage of the second electrode Source of the driving transistor T1. Accordingly, during the emission period, the tenth transistor T10 may cause a voltage of the overlapping electrode of the driving transistor T1 to have a voltage value of the second electrode Source of the driving transistor T1.

The eleventh transistor T11 may serve to transfer the overlapping electrode voltage VBML to the overlapping electrode (the second driving gate electrode) of the driving transistor T1. The gate electrode of the eleventh transistor T11 may be connected to the fourth scan line 154, the second electrode of the eleventh transistor T11 may be connected to the overlapping electrode (the second driving gate electrode) of the driving transistor T1 and the first electrode of the tenth transistor T10, and the first electrode of the eleventh transistor T11 may be connected to the overlapping electrode voltage line 129. In case that the eleventh transistor T11 is turned on by a positive voltage of the fourth scan signal GC flowing through the fourth scan line 154, the overlapping electrode voltage VBML may be applied to the overlapping electrode (the second driving gate electrode) of the driving transistor T1. The eleventh transistor T11 may be included in each pixel circuit unit included in the pixel, and according to an embodiment, as illustrated in FIG. 11, one eleventh transistor T11 may be formed across multiple pixels or multiple pixel circuit units. One eleventh transistor T11 may be formed in one row of the eleventh transistor T11 formed to correspond to the pixels.

Referring to FIG. 12, only the driving transistor T1 may include the overlapping electrode overlapping the channel included in the semiconductor layer. At least one of the other transistors T2, T3, T4, T5, T6, T7, T8, T9, T10, and T11 may have an overlapping electrode overlapping a channel included in the semiconductor layer. In all the transistors T2, T3, T4, T5, T6, T7, T8, and T9 except the driving transistor T1, each overlapping electrode may be electrically connected to each gate electrode, and each overlapping electrode may serve as another gate electrode (hereinafter also referred to as second gate electrode).

In the above description, all the transistors T1, T2, T3, T4, T5, T6, T7, T8, T9, T10, and T11 may be formed as n-type transistors and an oxide semiconductor may be used for the semiconductor layer, but what may be necessary for the transistors is just an n-type transistor, and a silicon semiconductor may also be used for the semiconductor layer.

The first transfer electrode of the transfer capacitor Cpr may be connected to the D node D_node to be connected to the second electrode of the second transistor T2 and the second electrode of the third transistor T3, and the second transfer electrode may be connected to the driving gate electrode Gate of the driving transistor T1, the second electrode of the storage capacitor Cst, the second electrode of the fourth transistor T4, and the second electrode of the fifth transistor T5.

The first electrode of the storage capacitor Cst may be connected to the second electrode of the eighth transistor T8, the second electrode of the seventh transistor T7, the second electrode of the tenth transistor T10, and an electrode (anode) of the light emitting diode LED, and the second electrode may be connected to the gate electrode of the driving transistor T1, the second electrode of the fourth transistor T4, the second electrode of the fifth transistor T5, and the second transfer electrode of the transfer capacitor Cpr.

A first electrode (anode) of the light emitting diode LED may be connected to the second electrode of the seventh transistor T7, the second electrode of the eighth transistor T8, the second electrode of the tenth transistor T10, and the first electrode of the storage capacitor Cst, and a second electrode (cathode) of the light emitting diode LED may be connected to the driving low voltage line 178 to receive the driving low voltage ELVSS.

It has been described that a pixel PX includes 11 transistors T1 to T11, two capacitors (the transfer capacitor Cpr and the storage capacitor Cst), and a light emitting diode LED, but the disclosure is not limited thereto, and in case that the eleventh transistor T11 is formed in common as shown in FIG. 11, a pixel PX may include ten transistors T1 to T10, two capacitors (a transfer capacitor Cpr and a storage capacitor Cst), and a light emitting diode LED.

In the above, a circuit structure of a pixel according to another embodiment has been described with reference to FIG. 12.

The signal of FIG. 2 may also be applied to the pixel of FIG. 12, and an operation of the pixel of FIG. 12 may be similar to that of the pixel of FIG. 1. A difference between the pixel of FIG. 1 and the pixel of FIG. 12 may be in the fifth transistor T5 and the ninth transistor T9, and both transistors T5 and T9 may be connected to the fourth scan line 154. Since the gate-on voltage may be applied to the fourth scan line 154 during the compensation period, the pixel of FIG. 1 may be different from the pixel of FIG. 12 in the operation of the compensation period. During other sections, for example, the initialization period, the writing period, and the emission period, the operations of the pixel of FIG. 1 and the pixel of FIG. 12 may be the same. Accordingly, the pixel operation of FIG. 12 during the compensation period will be described in detail below.

Referring to FIG. 2, during the compensation period, the fourth scan signal GC may be changed to the gate-on voltage (the high level voltage), and the second scan signal GR may be maintained at the gate-on voltage, other signals (the first emission signal EM, the first scan signal GW, and the third scan signal GI) may have the gate-off voltage.

Referring to FIG. 12, the fifth transistor T5, the ninth transistor T9, and the eleventh transistor T11 may be turned on by the fourth scan signal GC in a state in which the third transistor T3 may be turned on by the second scan signal GR. The driving gate electrode Gate and the second electrode Source of the driving transistor T1 may be connected to each other by the fifth transistor T5, the compensation voltage Vcomp may be applied to the first electrode Drain of the driving transistor T1 by the ninth transistor T9, and the overlapping electrode voltage VBML may be applied to the overlapping electrode (the second driving gate electrode) of the driving transistor T1 by the eleventh transistor T11. Herein, the overlapping electrode voltage VBML may have a high voltage, and a threshold voltage of the driving transistor T1 may be shifted in a direction depending on a magnitude of the overlapping electrode voltage VBML, and the shifted threshold voltage may be maintained. For example, it may be possible to prevent a case in which the threshold voltage of the driving transistor T1 is shifted to not be turned on by the reference voltage Vref by using the overlapping electrode voltage VBML, and a constant output current may be generated depending on the data voltage Vdata.

Since the driving transistor T1 may be turned on in an initialization step, the first electrode Drain of the driving transistor T1 may be connected to the driving gate electrode Gate of the driving transistor T1 and the second electrode of the storage capacitor Cst through the second electrode Source of the driving transistor T1 and the fifth transistor T5. Voltages of the driving gate electrode Gate of the driving transistor T1 and the second electrode of the storage capacitor Cst may have a reference voltage Vref, the compensation voltage Vcomp may be applied to the first electrode Drain the driving transistor T1, and the reference voltage Vref may have a higher voltage than the compensation voltage Vcomp, and thus in case that the voltage value stored in the second electrode of the storage capacitor Cst gradually decreases from the reference voltage Vref and the driving transistor T1 turns off, voltage reduction stops and a corresponding voltage value may be stored in the second electrode of the storage capacitor Cst. In case that the driving transistor T1 is turned off, a voltage of the driving gate electrode Gate may be higher than a voltage of the first electrode Drain of the driving transistor T1 by a threshold voltage Vth, and thus in case that the compensation period ends, the voltage of the second electrode of the storage capacitor Cst may be higher than the compensation voltage Vcomp by the threshold voltage Vth of the driving transistor T1. The voltage of the second electrode of the storage capacitor Cst may be the same as a voltage of the driving gate electrode of the driving transistor T1, and the voltage of the driving gate electrode may be as Equation 1 above.

During the compensation period as described above, a more uniform compensation operation may be performed as the data voltage Vdata that varies depending on a gray level may not be applied, but a constant compensation voltage Vcomp may be applied and compensated.

In the pixel of FIG. 12, operations of the writing period and the emission period after the compensation period may be the same as those of the pixel of FIG. 1, and an operation of the initialization period before the compensation period may be the same as that of the pixel of FIG. 1. A detailed description thereof will be omitted.

In the above, in order to distinguish an embodiment of FIG. 1 from an embodiment of FIG. 12, all of the first electrodes of the driving transistor T1 may be described as Drain and all of the second electrodes may be described as Source, but according to an embodiment, the first electrode may be a source, and the second electrode may be a drain.

Hereinafter, a method of manufacturing a pad structure of FIG. 12 will be sequentially described through FIG. 13 to FIG. 16.

FIG. 13 to FIG. 16 each schematically illustrate a circuit diagram of a modified pixel according to an embodiment of FIG. 12.

Figure 13:
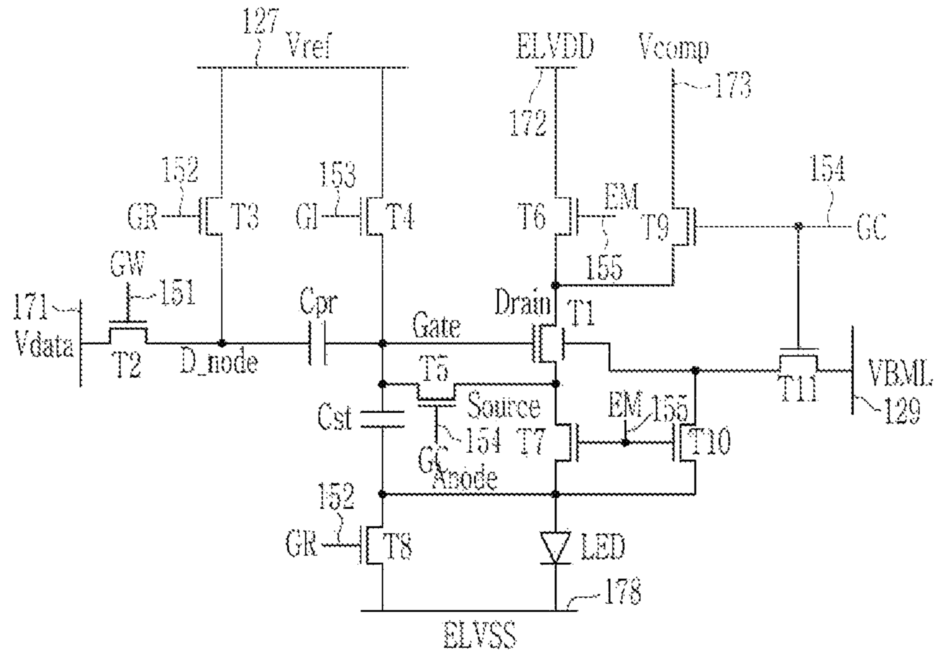
FIG. 13 to FIG. 16 each schematically illustrate a circuit diagram of a modified pixel according to an embodiment of FIG. 12.

Unlike in the pixel of FIG. 12, in the pixel according to an embodiment of FIG. 13, a first electrode of the eighth transistor T8 may be connected to the driving low voltage line 178 instead of the initialization voltage line 128.

In an embodiment of FIG. 13, an electrode (anode) of the light emitting diode LED may be initialized to the driving low voltage ELVSS during the initialization period. In an embodiment of FIG. 13, there may be an advantage that the initialization voltage line 128 may not be formed.

Figure 14:
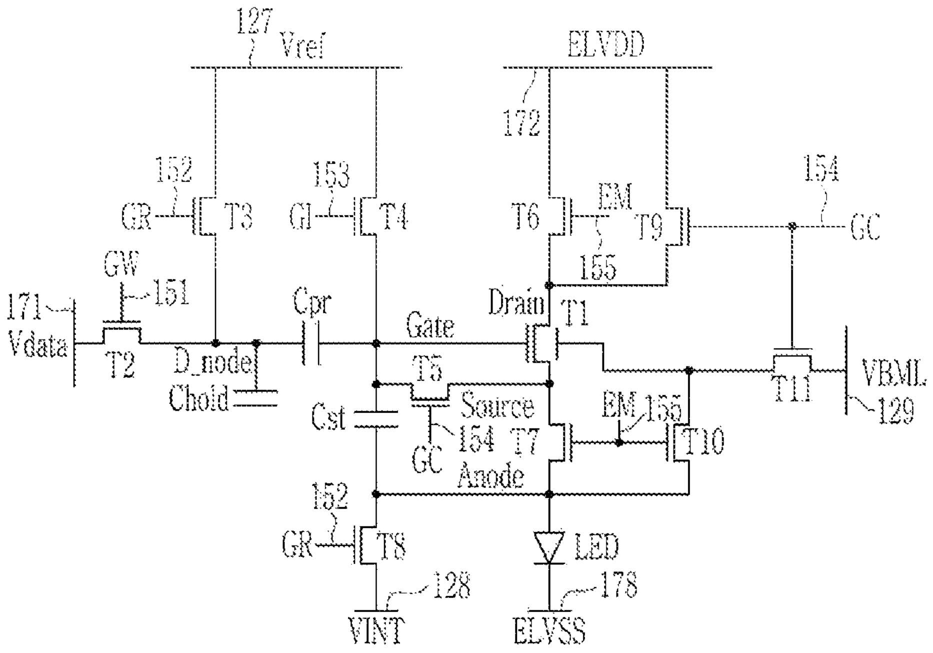

An embodiment of FIG. 14 may be an embodiment in which, unlike the pixel of FIG. 12, the first electrode of the eighth transistor T8 may be connected to the driving voltage line 172 instead of the compensation voltage line 173.

In an embodiment of FIG. 14, during the compensation period, the driving voltage ELVDD may be applied to the first electrode Drain of the driving transistor T1, and unlike Equation 1, a voltage of the driving gate electrode of the driving transistor T1 may be higher than the driving voltage ELVDD by the threshold voltage Vth of the driving transistor T1. The reference voltage Vref may have a higher voltage value than the driving voltage ELVDD. In an embodiment of FIG. 14, there is an advantage that the compensation voltage line 173 may not be formed.

Figure 15:
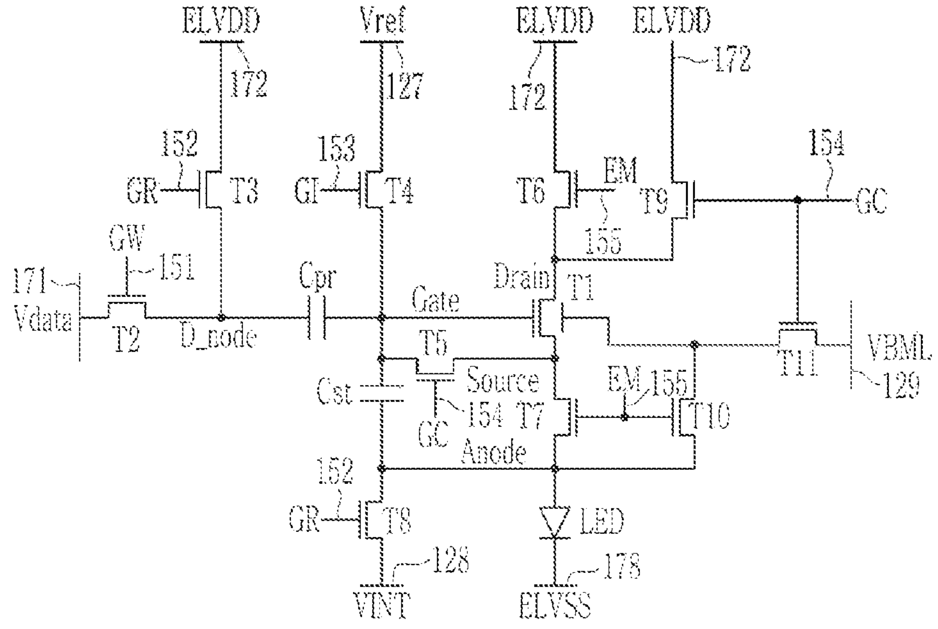
Figure 16:
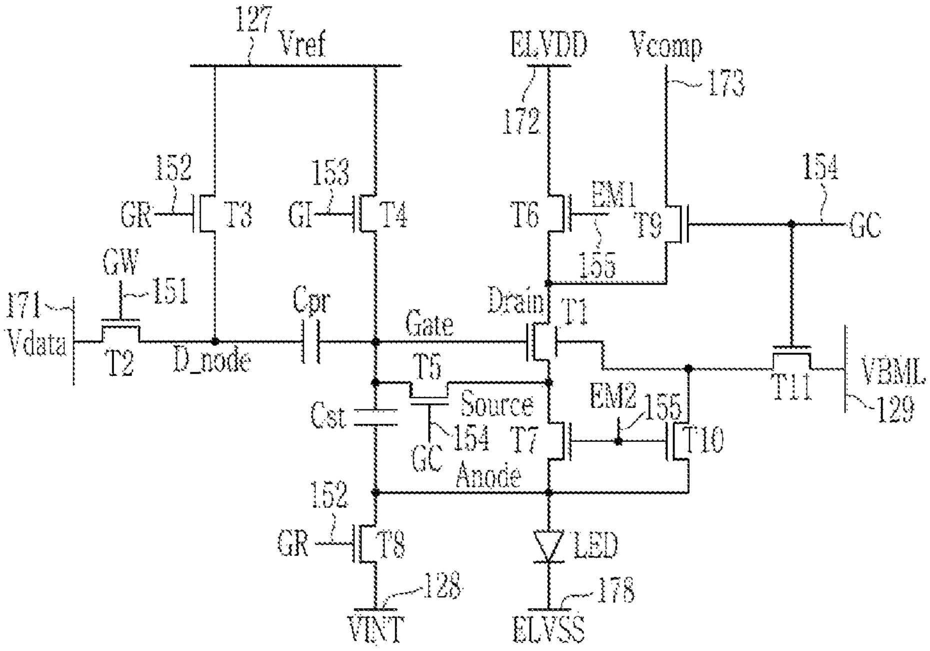

An embodiment of FIG. 15 is an embodiment in which, unlike the pixel of FIG. 12, the first electrode of the third transistor T3 may be connected to the driving voltage line 172 to receive the driving voltage ELVDD, and an embodiment of FIG. 16 is an embodiment in which, unlike the pixel of FIG. 12, the first emission signal EM may be divided into two signals EM1 and EM2 such that the emission signal EM1 applied to the sixth transistor T6 may be different from the emission signal EM2 applied to the seventh transistor T7 and the tenth transistor T10. The two emission signals EM1 and EM2 may be changed to a high voltage and a low voltage at different timings, but a gate-on voltage may be applied to both of them during the emission period.

As in the above embodiments of FIG. 13 to FIG. 16, the pixel of FIG. 12 may have various modifications in which a control signal applied to each transistor may be changed or a voltage applied to each transistor may be changed.

In embodiments of FIG. 12 to FIG. 16, it may have a same structure in which one eleventh transistor T11 transfers the overlapping electrode voltage VBML to the overlapping electrode (the second driving gate electrode) of the driving transistor T1 included in the pixels, thereby having a structure as shown in FIG. 11.

On the other hand, an embodiment having a different structure from that of FIG. 1 to FIG. 16 will be described as follows with reference to FIG. 17 to FIG. 30.

First, a circuit structure of a pixel including an n-type transistor as a driving transistor will be described with reference to FIG. 17.

Figure 17:
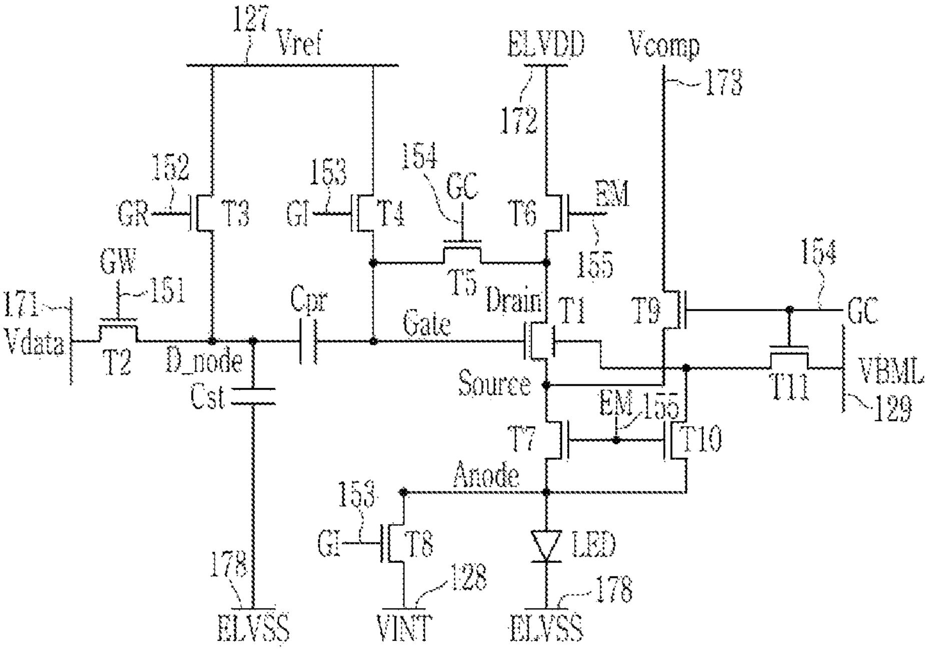
FIG. 17 schematically illustrates a circuit diagram of a pixel included in an emissive display device according to an embodiment.

FIG. 17 schematically illustrates a circuit diagram of a pixel included in an emissive display device according to an embodiment.

A pixel according to FIG. 17 may include multiple transistors T1, T2, T3, T4, T5, T6, T7, T8, T9, T10, and T11, a storage capacitor Cst, a transfer capacitor Cpr, and a light emitting diode LED which may be connected to wires 127, 128, 129, 151, 152, 153, 154, 155, 171, 172, 173, and 178. Herein, the transistors and the capacitor excluding the light emitting diode LED may constitute a pixel circuit unit, and a pixel may include the pixel circuit unit and the light emitting diode. In an embodiment of FIG. 17, the transistors T1, T2, T3, T4, T5, T6, T7, T8, T9, T10, and T11 may all be classified as n-type transistors. In an embodiment, the n-type transistor may be formed as an oxide semiconductor transistor including an oxide semiconductor. The n-type transistor may be a transistor that is turned on in case that a relatively high voltage of a gate electrode is applied.

Multiple wires 127, 128, 129, 151, 152, 153, 154, 155, 171, 172, 173, and 178 may be connected to a pixel PX. The wires may include a reference voltage line 127, an initialization voltage line 128, an overlapping electrode voltage line 129, a first scan line 151, a second scan line 152, a third scan line 153, a fourth scan line 154, a first emission control line 155, a data line 171, a driving voltage line 172, a compensation voltage line 173, and a driving low voltage line 178 (hereinafter also referred to as a common voltage line).

The first scan line 151 may transfer a first scan signal GW to the second transistor T2, the second scan line 152 may transfer a second scan signal GR to the third transistor T3, the third scan line 153 may transfer a third scan signal GI to the fourth transistor T4 and the eighth transistor T8, the fourth scan line 154 may transfer a fourth scan signal GC to the fifth transistor T5, the ninth transistor T9, and the eleventh transistor T11, and the first emission control line 155 may transfer the first emission signal EM to the sixth transistor T6, the seventh transistor T7, and the tenth transistor T1.

The data line 171 may be a line that transfers the data voltage Vdata generated by the data driver (not illustrated), and accordingly, a magnitude of the emission current transferred to the light emitting diode LED may be changed, so that luminance of the light emitting diode LED may also be changed. The driving voltage line 172 may apply a driving voltage ELVDD, and the driving low voltage line 178 may apply a driving low voltage ELVSS. The reference voltage line 127 may transfer a reference voltage Vref, and the initialization voltage line 128 may transfer an initialization voltage VINT. The overlapping electrode voltage line 129 may transfer an overlapping electrode voltage VBML applied to an overlapping electrode (hereinafter also referred to as a second driving gate electrode) overlapping a channel of the driving transistor T1, and the compensation voltage line 173 may transfer a compensation voltage Vcomp to a second electrode Source of the driving transistor T1. In an embodiment, voltages applied to the driving voltage line 172, the driving low voltage line 178, the reference voltage line 127, the initialization voltage line 128, the overlapping electrode voltage line 129, and the compensation voltage line 173 may each be a constant voltage.

The driving transistor T1 (also referred to as a first transistor) may be a n-type transistor and have an oxide semiconductor (polycrystalline semiconductor) as a semiconductor layer. It may be a transistor that adjusts a magnitude of an emission current that may be outputted to an electrode (hereinafter also referred to as an anode) of the light emitting diode LED depending on a magnitude of the voltage (i.e., the voltage stored in the transfer capacitor Cpr) of the gate electrode Gate (hereinafter also referred to as a driving gate electrode) of the driving transistor T1. Brightness of the light emitting diode LED may be adjusted depending on the magnitude of the emission current outputted to an electrode of the light emitting diode LED, and thus emission luminance of the light emitting diode LED may be adjusted depending on a data voltage Vdata applied to the pixel. For this purpose, a first electrode Drain of the driving transistor T1 may be connected to the driving voltage line 172 via the sixth transistor T6 by being positioned to receive the driving voltage ELVDD. The first electrode Drain of the driving transistor T1 may also be connected to a second electrode of the fifth transistor T5. The data voltage Vdata may be applied to the gate electrode of the driving transistor T1 through the second transistor T2 and the transfer capacitor Cpr. The second electrode Source of the driving transistor T1 may output an emission current to the light emitting diode LED, and may be connected to an electrode of the light emitting diode LED via the seventh transistor T7 (hereinafter also referred to as an output control transistor). The second electrode Source of the driving transistor T1 may also be connected to a second electrode of the ninth transistor T9. A gate electrode of the driving transistor T1 may be connected to a first electrode (hereinafter referred to as a second transfer electrode) of the transfer capacitor Cpr. Accordingly, the voltage of the gate electrode of the driving transistor T1 may change depending on a voltage stored in the transfer capacitor Cpr, and an emission current outputted by the driving transistor T1 may change accordingly. The transfer capacitor Cpr may serve to maintain a voltage of the gate electrode of the driving transistor T1 to be constant during a frame. A gate electrode of the driving transistor T1 may also be connected to the fourth transistor T4, to be initialized by receiving the reference voltage Vref. The driving transistor T1 may further include an overlapping electrode overlapping a channel positioned on the semiconductor layer, the overlapping electrode may receive the overlapping electrode voltage VBML through the eleventh transistor T11, and it may also be connected to the first electrode of the tenth transistor T10.

The second transistor T2, which may be an n-type transistor may have an oxide semiconductor as a semiconductor layer. The second transistor T2 may be a transistor that receives the data voltage Vdata into the pixel. A gate electrode of the second transistor T2 may be connected to the first scan line 151. A first electrode of the second transistor T2 may be connected to the data line 171. A second electrode of the second transistor T2 may be connected to a second electrode of the third transistor T3, the first electrode (hereinafter referred to as a 'first transfer electrode') of the transfer capacitor Cpr, and the second electrode of the storage capacitor Cst. Hereinafter, a node to which the second electrode of the second transistor T2, the second electrode of the third transistor T3, the first electrode of the transfer capacitor Cpr, and the second electrode of the storage capacitor Cst may be connected is also referred to as a D node D node. In case that the second transistor T2 is turned on by a positive voltage of the first scan signal GW transferred through the first scan line 151, the data voltage Vdata transferred through the data line 171 may be transferred to the transfer capacitor Cpr, and the data voltage Vdata may be transferred to the driving gate electrode of the driving transistor T1 through the transfer capacitor Cpr.

The third transistor T3, which may be an n-type transistor, may have an oxide semiconductor as a semiconductor layer. Since the third transistor T3 serves to transfer the reference voltage Vref to the D node D node, the reference voltage Vref may be transferred to the second electrode of the second transistor T2, the first electrode of the transfer capacitor Cpr, and the second electrode of the storage capacitor Cst. The gate electrode of the third transistor T3 may be connected to the second scan line 152, a first electrode of the third transistor T3 may be connected to the reference voltage line 127, and the second electrode of the third transistor T3 may be connected to the D node D_node and may be connected to the second electrode of the second transistor T2, the first electrode of the transfer capacitor Cpr, and the second electrode of the storage capacitor Cst. The third transistor T3 may be turned on by a positive voltage of the second scan signal GR received through the second scan line 152 to transfer the reference voltage Vref to the D node D_node.

The fourth transistor T4, which may be an n-type transistor, may have an oxide semiconductor as a semiconductor layer. The fourth transistor T4 may serve to transfer the reference voltage Vref to the gate electrode of the driving transistor T1 and the second transfer electrode of the transfer capacitor Cpr. A gate electrode of the fourth transistor T4 may be connected to the third scan line 153, a first electrode of the fourth transistor T4 may be connected to the reference voltage line 127, a second electrode of the fourth transistor T4 may be connected to the second transfer electrode of the transfer capacitor Cpr, the driving gate electrode of the driving transistor T1, and a second electrode of the fifth transistor T5. The fourth transistor T4 may be turned on by a positive voltage of the third scan signal GI transferred through the third scan line 153, and the reference voltage Vref may be transferred to the driving gate electrode of the driving transistor T1 and the second transfer electrode of the transfer capacitor Cpr.

The fifth transistor T5, which may be an n-type transistor, may have an oxide semiconductor as a semiconductor layer. The fifth transistor T5 may electrically connect the first electrode Drain of the driving transistor T1 and the driving gate electrode of the driving transistor T1. A gate electrode of the fifth transistor T5 may be connected to the first scan line 154, and a first electrode of the fifth transistor T5 may be connected to the first electrode Drain of the driving transistor T1 and a second electrode of the sixth transistor T6. The second electrode of the fifth transistor T5 may be connected to the driving gate electrode of the driving transistor T1, the second electrode of the fourth transistor T4, and the second transfer electrode of the transfer capacitor Cpr. The fifth transistor T5 may be turned on by a positive voltage of the fourth scan signal GC transferred through the fourth scan line 154, so as to connect the first electrode Drain of the driving transistor T1 and the driving gate electrode of the driving transistor T1.

The sixth transistor T6 and the seventh transistor T7, which may be n-type transistors, may have an oxide semiconductor as a semiconductor layer.

The sixth transistor T6 may serve to transfer the driving voltage ELVDD to the driving transistor T1. A gate electrode of the sixth transistor T6 may be connected to the first emission control line 155, a first electrode of the sixth transistor T6 may be connected to the driving voltage line 172, and the second electrode of the sixth transistor T6 may be connected to the first electrode Drain of the driving transistor T1 and the first electrode of the fifth transistor T5.

The seventh transistor T7 may serve to transfer an emission current outputted from the driving transistor T1 to the light emitting diode. A gate electrode of the seventh transistor T7 may be connected to the first emission control line 155, a first electrode of the seventh transistor T7 may be connected to the second electrode Source of the driving transistor T1 and the second electrode of the ninth transistor T9, and a second electrode of the seventh transistor T7 may be connected to an electrode of the light emitting diode LED, the second electrode of the eighth transistor T8, and the second electrode of the tenth transistor T10.

The eighth transistor T8, which may be an n-type transistor, may have an oxide semiconductor as a semiconductor layer. The eighth transistor T8 may serve to initialize an electrode of the light emitting diode LED. Hereinafter, the eighth transistor T8 is also referred to as a light emitting diode initialization transistor. A gate electrode of the eighth transistor T8 may be connected to the third scan line 153, the second electrode of the eighth transistor T8 may be connected to an electrode of the light emitting diode LED, the second electrode of the seventh transistor T7, and the second electrode of the tenth transistor T10, and a first electrode of the eighth transistor T8 may be connected to the initialization voltage line 128. In case that the eighth transistor T8 is turned on by a positive voltage of the third scan signal GI flowing through the third scan line 153, the initialization voltage VINT may be applied to an electrode of the light emitting diode LED to be initialized.

The ninth transistor T9, which may be an n-type transistor, may have an oxide semiconductor as a semiconductor layer. The ninth transistor T9 may serve to transfer the compensation voltage Vcomp to the second electrode Source of the driving transistor T1. Hereinafter, the ninth transistor T9 is also referred to as a compensation voltage transfer transistor. A gate electrode of the ninth transistor T9 may be connected to the fourth scan line 154, a second electrode of the ninth transistor T9 may be connected to the second electrode Source of the driving transistor T1 and the first electrode of the seventh transistor T7, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the second electrode Source of the driving transistor T1.

The tenth transistor T10, which may be an n-type transistor, may have an oxide semiconductor as a semiconductor layer. The tenth transistor T10 may serve to maintain an electrode of the light emitting diode LED and the overlapping electrode (the second driving gate electrode) of the driving transistor T1 at the same voltage during the emission period. A gate electrode of the tenth transistor T10 may be connected to the first emission control line 155, the second electrode of the tenth transistor T10 may be connected to an electrode of the light emitting diode LED, and a first electrode of the tenth transistor T10 may be connected to the overlapping electrode of the driving transistor T1 and the second electrode of the eleventh transistor T11. The tenth transistor T10 may be turned on during the emission period to electrically connect the overlapping electrode (the second driving gate electrode) of the driving transistor T1 and an electrode of the light emitting diode LED), and since the seventh transistor T7 may be turned on during the emission period, the voltage of an electrode (anode) of the light emitting diode LED may be the same as the voltage of the second electrode Source of the driving transistor T1. Accordingly, during the emission period, the tenth transistor T10 may cause a voltage of the overlapping electrode of the driving transistor T1 to have a voltage value of the second electrode Source of the driving transistor T1.

Figure 26:
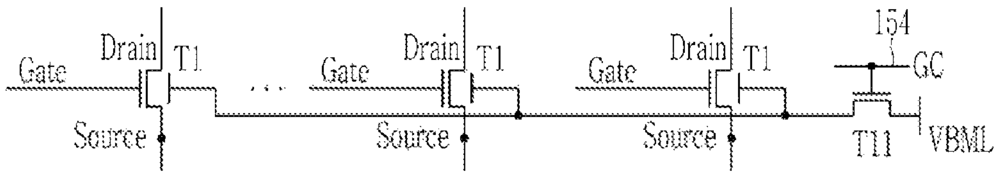
FIG. 26 schematically illustrates a modified structure of an eleventh transistor in an embodiment of FIG. 17.

The eleventh transistor T11, which may be an n-type transistor, may have an oxide semiconductor as a semiconductor layer. The eleventh transistor T11 may serve to transfer the overlapping electrode voltage VBML to the overlapping electrode (the second driving gate electrode) of the driving transistor T1. Hereinafter, the eleventh transistor T11 is also referred to as a superimposed voltage transfer transistor. The gate electrode of the eleventh transistor T11 may be connected to the fourth scan line 154, the second electrode of the eleventh transistor T11 may be connected to the overlapping electrode (the second driving gate electrode) of the driving transistor T1 and the first electrode of the tenth transistor T10, and the first electrode of the eleventh transistor T11 may be connected to the overlapping electrode voltage line 129. In case that the eleventh transistor T11 is turned on by a positive voltage of the fourth scan signal GC flowing through the fourth scan line 154, the overlapping electrode voltage VBML may be applied to the overlapping electrode (the second driving gate electrode) of the driving transistor T1. The eleventh transistor T11 may be included in each pixel circuit unit included in the pixel, and also according to an embodiment, as illustrated in FIG. 26, one eleventh transistor T11 may be formed across multiple pixels or multiple pixel circuit units. One eleventh transistor T11 may be formed in one row of the eleventh transistor T11 formed to correspond to the pixels.

Referring to FIG. 17, only the driving transistor T1 includes the overlapping electrode overlapping the channel included in the semiconductor layer. At least one of the other transistors T2, T3, T4, T5, T6, T7, T8, T9, T10, and T11 may have an overlapping electrode overlapping a channel included in the semiconductor layer. In all the transistors T2, T3, T4, T5, T6, T7, T8, and T9 except the driving transistor T1, each overlapping electrode may electrically be connected to each gate electrode, and each overlapping electrode may serve as another gate electrode (hereinafter also referred to as second gate electrode).

In the above description, all the transistors T1, T2, T3, T4, T5, T6, T7, T8, T9, T10, and T11 may be formed as n-type transistors and an oxide semiconductor may be used for the semiconductor layer, but what may be necessary for the transistors is just an n-type transistor, and a silicon semiconductor may also be used for the semiconductor layer.

The first transfer electrode of the transfer capacitor Cpr may be connected to the D node D_node to be connected to the second electrode of the second transistor T2, the second electrode of the third transistor T3, and the second electrode of the storage capacitor Cst, and the second transfer electrode may be connected to the driving gate electrode Gate of the driving transistor T1, the second electrode of the fourth transistor T4, and the second electrode of the fifth transistor T5.

The first electrode of the storage capacitor Cst may be connected to the driving low voltage line 178 to receive the driving low voltage ELVSS, and the second electrode may be connected to the D node D node to be connected to the second electrode of the second transistor T2, the second electrode of the third transistor T3, and the first transfer electrode of the transfer capacitor Cpr.

A first electrode (anode) of the light emitting diode LED may be connected to the second electrode of the seventh transistor T7, the second electrode of the eighth transistor T8, and the second electrode of the tenth transistor T10, and a second electrode (cathode) of the light emitting diode LED may be connected to the driving low voltage line 178 to receive the driving low voltage ELVSS.

It has been described that a pixel PX includes 11 transistors T1 to T11, two capacitors (a transfer capacitor Cpr and a storage capacitor Cst), and a light emitting diode LED, but the disclosure is not limited thereto, and in case that the eleventh transistor T11 is formed in common as shown in FIG. 26 to be described later, a pixel PX may include ten transistors T1 to T10, two capacitors (a transfer capacitor Cpr and a storage capacitor Cst), and a light emitting diode LED. Various modifications will be described below with reference to FIG. 23 to FIG. 30.

In the above, a circuit structure of a pixel according to an embodiment has been described with reference to FIG. 17.

Hereinafter, a waveform of a signal applied to the pixel of FIG. 17 and an operation of the pixel depending on the waveform will be described with reference to FIG. 2 to FIG. 22.

Figure 18:
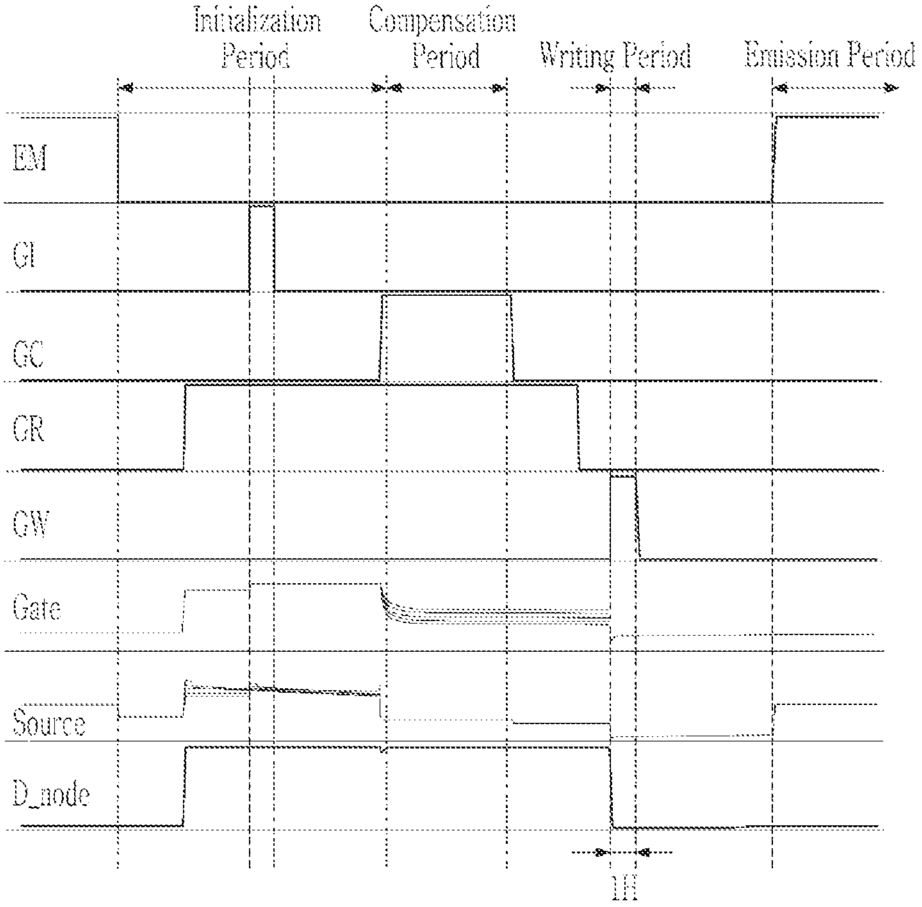
FIG. 18 schematically illustrates a waveform diagram showing a signal applied to the pixel of FIG. 17.
Figure 19:
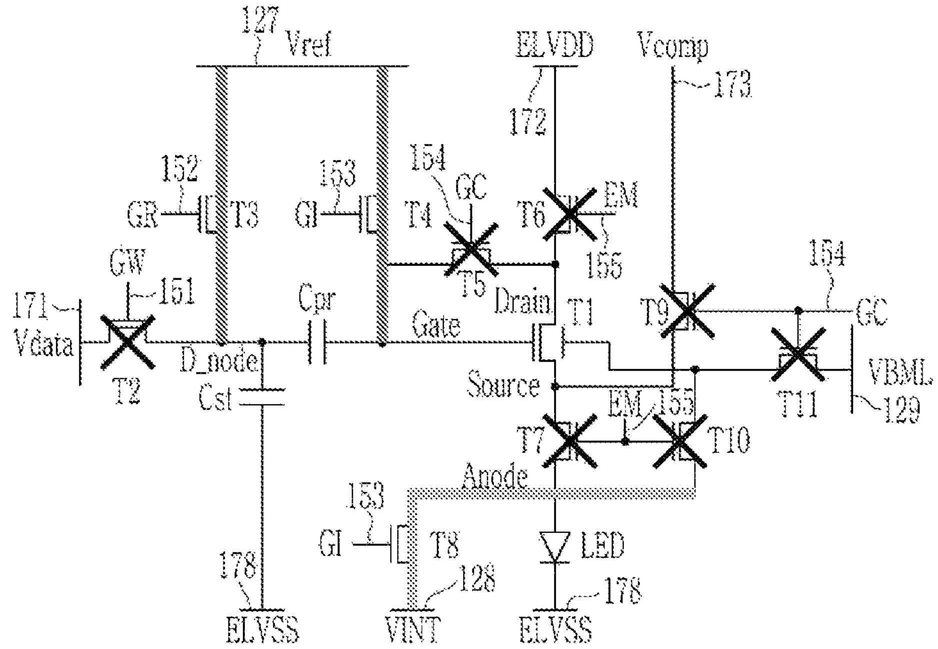
FIG. 19 to FIG. 22 each schematically illustrate a view for describing an operation of the pixel of FIG. 17 for each section based on the signal of FIG. 18.

FIG. 18 schematically illustrates a waveform diagram showing a signal applied to the pixel of FIG. 17, and FIG. 19 to FIG. 22 each schematically illustrate a view for describing an operation of the pixel of FIG. 17 for each period based on the signal of FIG. 18.

Referring to FIG. 18, in case that a signal applied to a pixel is divided into periods, it may be divided into an initialization period, a compensation period, a writing period, and an emission period. In an embodiment, an n-type transistor may be used, and thus a high voltage may be a gate-on voltage and a low voltage may be a gate-off voltage in FIG. 2.

First, referring to FIG. 18, the emission period may be a period in which the light emitting diode LED emits light, and an initialization period, a compensation period, and a writing period may be sequentially located between adjacent emission periods. During the emission period, a gate-on voltage (a high level voltage) may be applied to the first light emitting signal EM to turn on the sixth transistor T6 and the seventh transistor T7. In case that the sixth transistor T6 is turned on so that the driving voltage ELVDD is transferred to the driving transistor T1, an output current may be generated depending on a voltage of a gate electrode of the driving transistor T1. The output current of the driving transistor T1 may be transmitted to the light emitting diode LED through the turned-on seventh transistor T7, to enable the light emitting diode LED to emit light. In FIG. 18, the emission period during which the first emission signal EM applies the gate-on voltage (high level voltage) is long is not illustrated, but the emission period actually may have the longest time. The emission period is simply illustrated in FIG. 2 without specific explanation because only the above simple operation may be performed.

Referring to FIG. 18, a voltage change of the driving gate electrode Gate and the second electrode Source of the driving transistor T1 and a voltage change of the D node D_node are also illustrated during the initialization period.

Referring to FIG. 18, as the first emission signal EM may be changed to a gate-off voltage (a low level voltage), the emission period may end and the initialization period may be entered.

The initialization period will be described with reference to FIG. 2 and FIG. 3 as follows.

The initialization period may be a period in which the gate-on voltage (high level voltage) is applied to the second scan signal GR and the third scan signal GI, and referring to FIG. 18, first, the second scan signal GR is changed to the gate-on voltage (high level voltage), and the third scan signal GI is changed to the gate-on voltage (high level voltage). Referring to FIG. 18, a period during which the third scan signal GI maintains the gate-on voltage (the high level voltage) may be shorter than the period in which the second scan signal GR maintains the gate-on voltage (the high level voltage), and the second scan signal GR maintains the gate-on voltage (the high level voltage) until a subsequent compensation period. The first light emitting signal EM, the first scan signal GW, and the fourth scan signal GC may maintain the gate-off voltage (the low level voltage).

An operation of a pixel during an initialization period is described with reference to FIG. 3. A transistor marked with an X in FIG. 3 shows a turned-off state, and a bold line in a circuit diagram show that it is connected through a corresponding wire and transistor. This illustration is the same in FIG. 20 to FIG. 22.

During the initialization period, first, the third transistor T3 may be turned on by the gate-on voltage of the second scan signal GR, to change the voltage value of the D node D_node to the reference voltage Vref so that voltage values of the first transfer electrode of the transfer capacitor Cpr and the second electrode of the store capacitor Cst may be initialized to the reference voltage Vref. Thereafter, the fourth transistor T4 and the eighth transistor T8 may be turned on while the gate-on voltage may be applied to the third scan signal GI. The fourth transistor T4 may be turned on to initialize the voltage of the driving gate electrode Gate of the driving transistor T1 to the reference voltage Vref, and the eighth transistor T8 may be turned on to initialize an electrode (anode) of the light emitting diode LED to the initialization voltage VINT. The reference voltage Vref may have a high voltage so that the driving transistor T1 has a turned-on state, opposite ends of the transfer capacitor Cpr have the reference voltage Vref, and opposite ends of the storage capacitor Cst may have the reference voltage Vref and the driving low voltage ELVSS.

Referring to FIG. 18, as the fourth scan signal GC may be changed to the gate-on voltage (high level voltage), it enters the compensation period, and the second scan signal GR may be maintained at the gate-on voltage, and other signals (the first emission signal EM, the first scan signal GW, and the third scan signal GI) may have the gate-off voltage.

Figure 20:
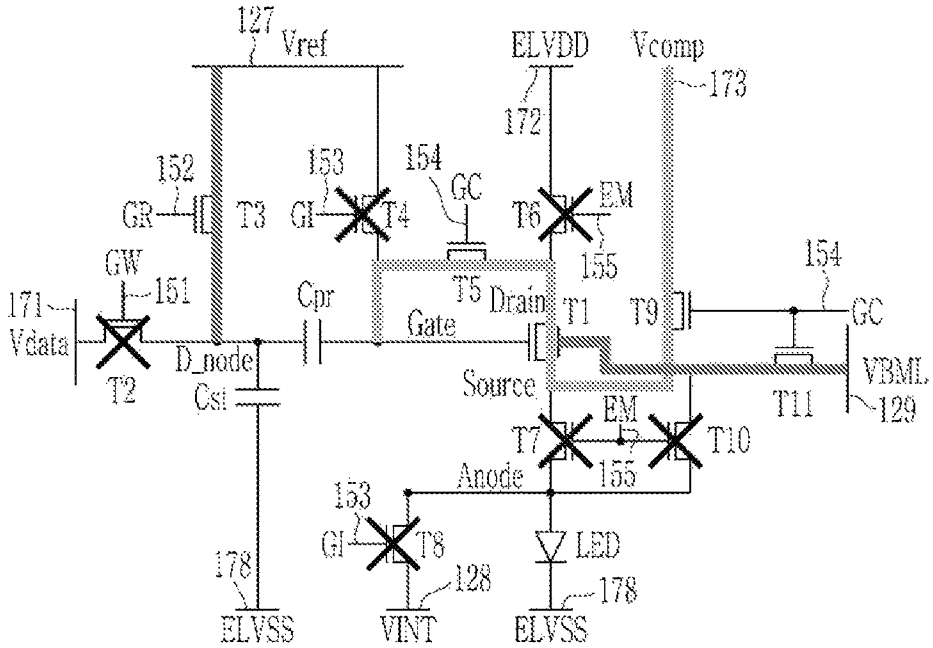

Referring to FIG. 20, the fifth transistor T5, the ninth transistor T9, and the eleventh transistor T11 may be turned on by the fourth scan signal GC in a state in which the third transistor T3 may be turned on by the second scan signal GR. The driving gate electrode Gate and the first electrode Drain of the driving transistor T1 may be connected to each other by the fifth transistor T5, the compensation voltage Vcomp may be applied to the second electrode Source of the driving transistor T1 by the ninth transistor T9, and the overlapping electrode voltage VBML may be applied to the overlapping electrode (the second driving gate electrode) of the driving transistor T1 by the eleventh transistor T11. Herein, the overlapping electrode voltage VBML may have a high voltage, and a threshold voltage of the driving transistor T1 may be shifted in a direction depending on a magnitude of the overlapping electrode voltage VBML, and the shifted threshold voltage may be maintained. For example, it is possible to prevent a case in which the threshold voltage of the driving transistor T1 is shifted to not be turned on by the reference voltage Vref by using the overlapping electrode voltage VBML, and a constant output current may be generated depending on the data voltage Vdata.

Since the driving transistor T1 may be turned on in an initialization step, the second electrode Source of the driving transistor T1 may be connected to the driving gate electrode Gate of the driving transistor T1, and the second electrode of the transfer capacitor Cpr through the first electrode Drain of the driving transistor T1 and the fifth transistor T5. Voltages of the driving gate electrode Gate of the driving transistor T1 and the second transfer electrode of the transfer capacitor Cpr may have a reference voltage Vref, the compensation voltage Vcomp may be applied to the second electrode Source of the driving transistor T1, and the reference voltage Vref has a higher voltage than the compensation voltage Vcomp, and thus in case that the voltage value stored in the second transfer electrode of the transfer capacitor Cpr gradually decreases from the reference voltage Vref and the driving transistor T1 turns off, voltage reduction stops and a corresponding voltage value may be stored in the second transfer electrode of the transfer capacitor Cst. In case that the driving transistor T1 is turned off, a voltage of the driving gate electrode Gate may be higher than a voltage of the second electrode Source of the driving transistor T1 by a threshold voltage Vth, and thus in case that the compensation period ends, the voltage of the second transfer electrode of the transfer capacitor Cpr may be higher than the compensation voltage Vcomp by the threshold voltage Vth of the driving transistor T1. A voltage of the second transfer electrode of the transfer capacitor Cst may be the same as a voltage of the driving gate electrode of the driving transistor T1, and the voltage of the driving gate electrode may be as Equation 3 below.

$$\text{Voltage of driving gate electrode} = \text{Vcomp} + Vth \qquad \text{[Equation 3]}$$

During the compensation period as described above, a more uniform compensation operation may be performed as the data voltage Vdata that varies depending on a gray level may not be applied, but a constant compensation voltage Vcomp may be applied and compensated.

Referring back to FIG. 18, as the fourth scan signal GC may be changed to the gate-off voltage (the low level voltage), the compensation period ends, and thereafter, the second scan signal GR also enters the writing period while being changed to the gate-off voltage (the low level voltage). During the write period, the gate-on voltage (the high level voltage) may be applied to the first scan signal GW.

Figure 21:
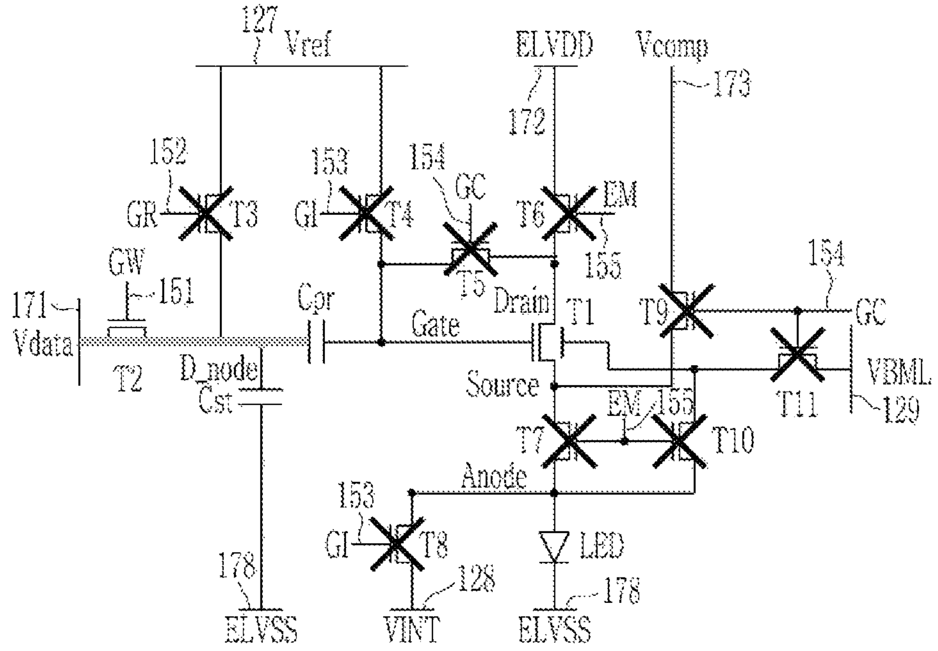

Referring to FIG. 21, as the second scan signal GR may also be changed to the gate-off voltage (the low level voltage), the third transistor T3 may be turned off so that the reference voltage Vref may no longer be transferred to the first transfer electrode and the D node D node of the transfer capacitor Cpr. Thereafter, as the gate-on voltage (the high level voltage) may be applied to the first scan signal GW, the second transistor T2 may be turned on to transfer the data voltage Vdata to the first transfer electrode and the D node D node of the transfer capacitor Cpr.

During the compensation period, a voltage value stored in the second transfer electrode of the transfer capacitor Cpr may be the same as in Equation 3, and during the writing period, as the voltage value of the first transfer electrode of the transfer capacitor Cpr varies, a voltage value of the second transfer electrode also may change. For example, during the compensation period, a voltage value of the first transfer electrode may be changed from the reference voltage Vref to the data voltage Vdata, and thus, a voltage value of the second transfer electrode may be changed by a ratio of a value obtained by subtracting the reference voltage Vref from the data voltage Vdata. Accordingly, the voltage value of the second transfer electrode and the voltage of the driving gate electrode after the writing period may be expressed by Equation 4 below.

$$\text{Voltage of driving gate electrode} = \text{Vref} - Vth + \alpha(\text{Vdata} - \text{Vref}) \quad \text{[Equation 4]}$$

Herein, α may be Cpr/(Cpr+Cst), and Cst and Cpr may be capacitance values of the storage capacitor and the hold capacitor, respectively.

The threshold voltage Vth among voltages of the driving gate electrode in Equation 4 may be used to turn on the driving transistor T1, and even in case that the threshold voltage is different for each driving transistor T1, it may be compensated. In Equation 4, values other than the threshold voltage Vth may be used by the driving transistor T1 to generate an output current.

Referring back to FIG. 18, the writing period ends, and the first emission signal EM enters the emission period again while the gate-on voltage may be applied.

Figure 22:
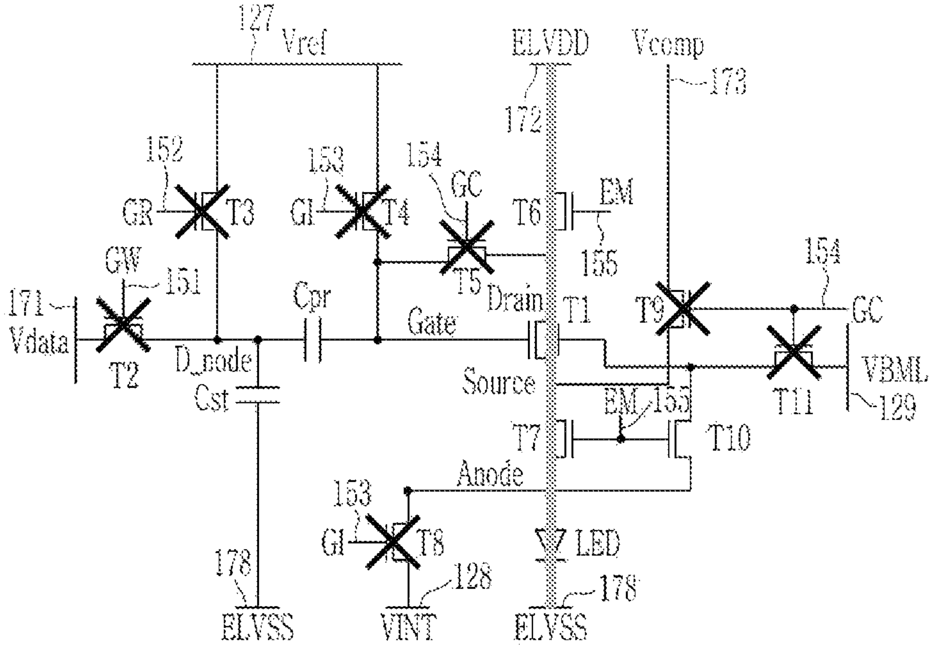

Referring to FIG. 22, the sixth transistor T6, the seventh transistor T7, and the tenth transistor T10 may be turned on by the gate-on voltage (the high level voltage) of the first emission signal EM.

In case that the sixth transistor T6 is turned on so that the driving voltage ELVDD is transferred to the driving transistor T1, an output current may be generated depending on a voltage (i.e., a voltage of Equation 4) of the driving gate electrode of the driving transistor T1. The output current of the driving transistor T1 may be transmitted to the light emitting diode LED through the turned-on seventh transistor T7, to enable the light emitting diode LED to emit light.

An electrode (anode) of the light emitting diode LED and the overlapping electrode of the driving transistor T1 may be connected by the turned-on tenth transistor T10, and the voltage of an electrode (anode) of the light emitting diode LED may be the same as the voltage of the second electrode Source of the driving transistor T1, and thus finally, the tenth transistor T10 enables a voltage of the overlapping electrode of the driving transistor T1 to have a voltage value of the second electrode Source of the driving transistor T1. As a result, the voltage of the overlapping electrode of the driving transistor T1 may be kept constant depending on the voltage value of the second electrode Source so that a channel characteristic of the driving transistor T1 may not be changed to generate a constant output current.

In the above, the circuit structure and operation of the pixel have been described with reference to FIG. 17 to FIG. 22.

Hereinafter, a modified structure of the pixel structure of FIG. 17 will be described with reference to FIG. 23 to FIG. 25.

Figure 23:
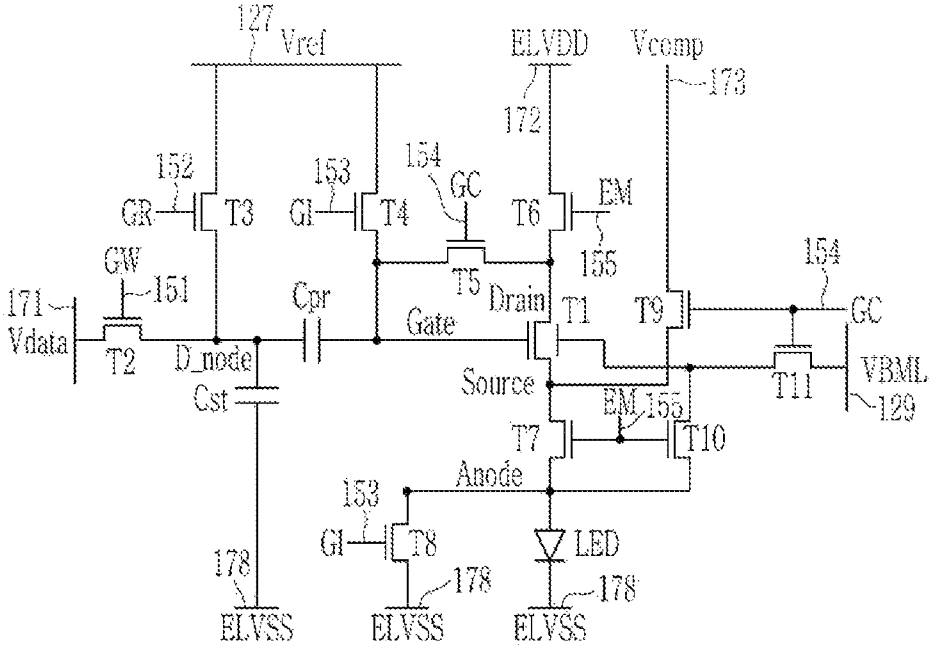
FIG. 23 to FIG. 25 each schematically illustrate a circuit diagram of a modified pixel according to an embodiment of FIG. 17.
Figure 24:
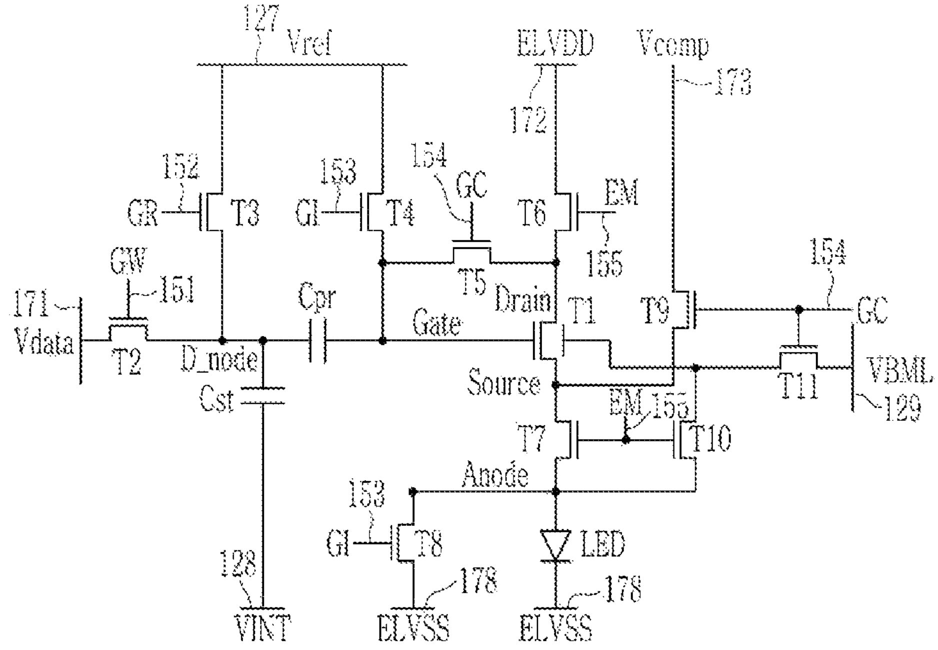
Figure 25:
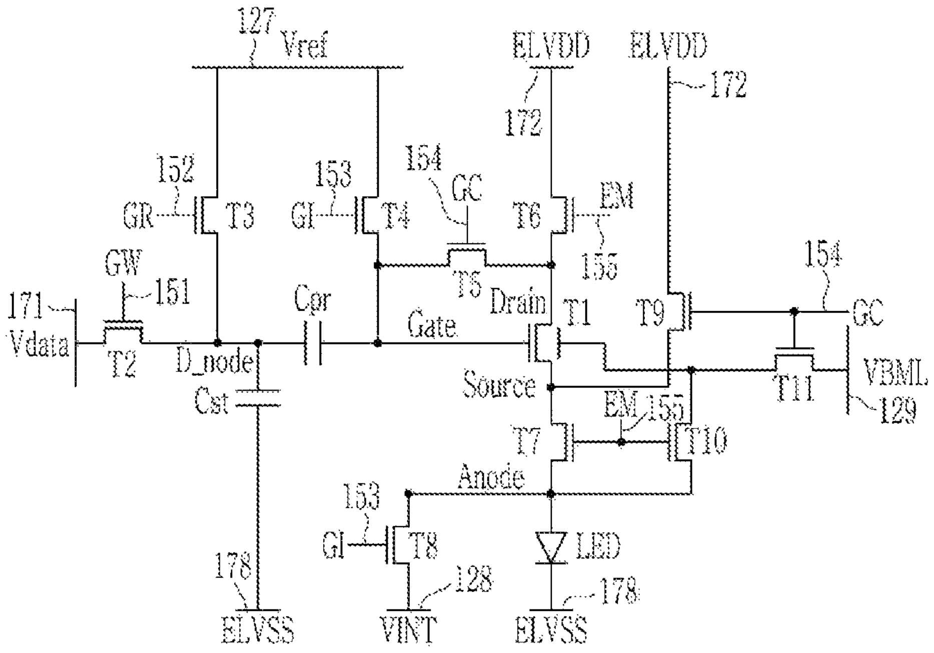

FIG. 23 to FIG. 25 each schematically illustrate a circuit diagram of a modified pixel according to an embodiment of FIG. 17.

Unlike in the pixel of FIG. 17, in the pixel according to an embodiment of FIG. 23, a first electrode of the eighth transistor T8 may be connected to the driving low voltage line 178 instead of the initialization voltage line 128.

In an embodiment of FIG. 23, an electrode (anode) of the light emitting diode LED may be initialized to the driving low voltage ELVSS during the initialization period. In an embodiment of FIG. 23, there may be an advantage that the initialization voltage line 128 may not be formed.

An embodiment of FIG. 24 is an embodiment in which, unlike the pixel of FIG. 17, the first electrode of the storage capacitor Cst may be connected to the initialization voltage line 128 instead of the driving low voltage line 178.

An embodiment of FIG. 25 is an embodiment in which, unlike the pixel of FIG. 17, the first electrode of the eighth transistor T8 may be connected to the driving voltage line 172 instead of the compensation voltage line 173.

In an embodiment of FIG. 25, during the compensation period, the driving voltage ELVDD may be applied to the second electrode Source of the driving transistor T1, and unlike Equation 3, a voltage of the driving gate electrode of the driving transistor T1 may be higher than the driving voltage ELVDD by the threshold voltage Vth of the driving transistor T1. The reference voltage Vref may have a higher voltage value than the driving voltage ELVDD. In an embodiment of FIG. 25, there may be an advantage that the compensation voltage line 173 may not be formed.

In the above description, an embodiment in which the tenth transistor T10 and the eleventh transistor T11 may be included in one pixel has been described. However, according to an embodiment, a structure in which one transistor T10 or one eleventh transistor T11 may be connected every multiple pixels may be provided, and embodiments thereof will be described with reference to FIG. 27 and FIG. 26.

FIG. 26 schematically illustrates a modified structure of an eleventh transistor in an embodiment of FIG. 17.

FIG. 26 illustrates only the respective driving transistors T1 included in the pixels for convenience, and a connection structure between the overlapping electrodes of the driving transistors T1 and one eleventh transistor T11 is illustrated.

According to an embodiment of FIG. 26, the second electrode of the eleventh transistor T11 may be connected to the overlapping electrode (the second driving gate electrode) of the driving transistors T1, and in case that the gate-on voltage (the high level voltage) of the fourth scan line 154 is applied during the compensation period, the eleventh transistor T11 may be turned on to simultaneously apply the overlapping electrode voltage VBML to the overlapping electrodes of the driving transistors T1.

In an embodiment of FIG. 26, the threshold voltages of the driving transistors T1 may be shifted in the same direction by applying a same overlapping electrode voltage VBML to the overlapping electrodes of the driving transistors T1, and as a result, it may be possible to prevent a case in which the driving transistor T1 may not be turned on during the compensation period, and a constant output current may be generated depending on the data voltage Vdata during the writing period.

In an embodiment of FIG. 26, one eleventh transistor T11 may be formed for each pixel row, and the overlapping electrode voltage VBML may be simultaneously applied by one eleventh transistor T11 to overlapping electrodes of all the driving transistors T1 included in the pixels in a row. A number of overlapping electrodes of the driving transistors T1 connected to one eleventh transistor T11 may vary according to an embodiment.

Hereinafter, an embodiment in which the fifth transistor T5 and the ninth transistor T9 may be connected to the driving transistor T1 as a modified circuit structure of the pixel of FIG. 17 will be described with reference to FIG. 27.

Figure 27:
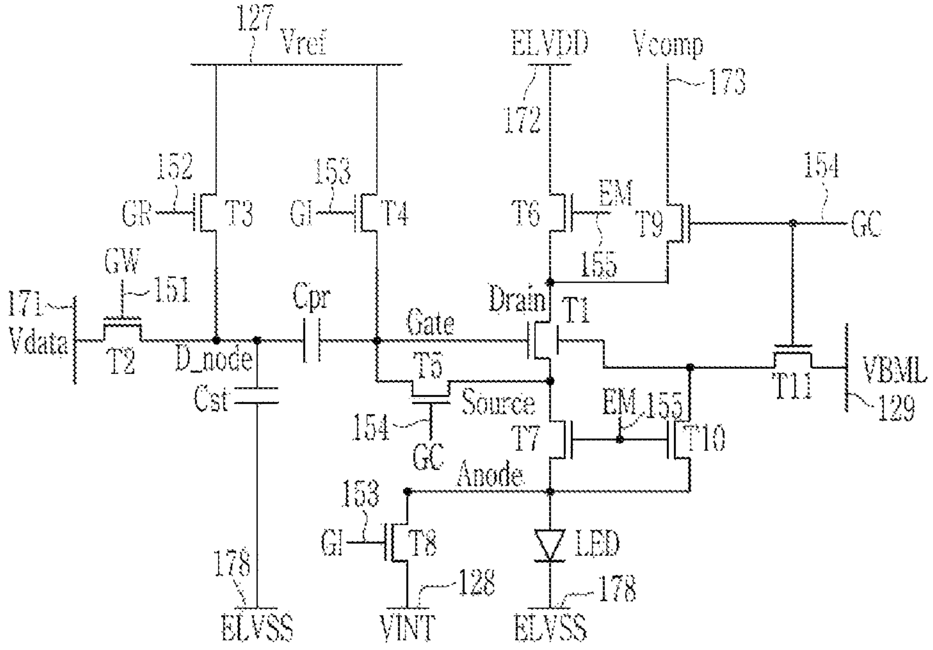
FIG. 27 schematically illustrates a circuit diagram of a pixel included in an emissive display device according to another embodiment.

FIG. 27 schematically illustrates a circuit diagram of a pixel included in an emissive display device according to another embodiment.

In the pixel according to an embodiment of FIG. 27, the fifth transistor T5 may connect the second electrode Source of the driving transistor T1 and the driving gate electrode Gate, and the ninth transistor T9 may be configured to transfer the compensation voltage Vcomp to the first electrode Drain of the driving transistor T1. For other transistors and capacitors, a same connection structure may be provided.

Specifically, the fifth transistor T5 may electrically connect the second electrode Source of the driving transistor T1 and the driving gate electrode Gate of the driving transistor T1. A gate electrode of the fifth transistor T5 may be connected to the first scan line 154, and a first electrode of the fifth transistor T5 may be connected to the first electrode Source of the driving transistor T1 and a first electrode of the seventh transistor T7. The second electrode of the fifth transistor T5 may be connected to the driving gate electrode of the driving transistor T1, the second electrode of the fourth transistor T4, and the second transfer electrode of the transfer capacitor Cpr. The fifth transistor T5 may be turned on by a positive voltage of the fourth scan signal GC transferred through the fourth scan line 154, so as to connect the second electrode Source of the driving transistor T1 and the driving gate electrode of the driving transistor T1.

The ninth transistor T9 may serve to transfer the compensation voltage Vcomp to the first electrode Drain of the driving transistor T1. Hereinafter, the ninth transistor T9 is also referred to as a compensation voltage transfer transistor. A gate electrode of the ninth transistor T9 may be connected to the fourth scan line 154, a second electrode of the ninth transistor T9 may be connected to the first electrode Drain of the driving transistor T1 and the second electrode of the sixth transistor T6, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the first electrode Drain of the driving transistor T1.

Hereinafter, a connection relationship between other transistors and capacitors in addition to the fifth transistor T5 and the ninth transistor T9 will be described in detail as follows.

Even in one pixel of FIG. 27, the transistors and the capacitor excluding the light emitting diode LED may constitute a pixel circuit unit, and one pixel may include the pixel circuit unit and the light emitting diode. In an embodiment of FIG. 27, the transistors T1, T2, T3, T4, T5, T6, T7, T8, T9, T10, and T11 may all be classified as n-type transistors. In an embodiment, the n-type transistor may be formed as an oxide semiconductor transistor including an oxide semiconductor. The n-type transistor may be a transistor that is turned on in case that a relatively high voltage of a gate electrode is applied.

Multiple wires 127, 127, 128, 129, 151, 152, 153, 155, 171, 172, 173, and 178 may be connected to the pixel PX of FIG. 27. The wires may include a reference voltage line 127, an initialization voltage line 128, an overlapping electrode voltage line 129, a first scan line 151, a second scan line 152, a third scan line 153, a fourth scan line 154, a first emission control line 155, a data line 171, a driving voltage line 172, a compensation voltage line 173, and a driving low voltage line 178 (hereinafter also referred to as a common voltage line).

The first scan line 151 may transfer a first scan signal GW to the second transistor T2, the second scan line 152 may transfer a second scan signal GR to the third transistor T3, the third scan line 153 may transfer a third scan signal GI to the fourth transistor T4 and the eighth transistor T8, the fourth scan line 154 may transfer a fourth scan signal GC to the fifth transistor T5, the ninth transistor T9, and the eleventh transistor T11, and the first emission control line 155 may transfer the first emission signal EM to the sixth transistor T6, the seventh transistor T7, and the tenth transistor T1.

The data line 171 may be a line that transfers the data voltage Vdata generated by the data driver (not illustrated), and accordingly, a magnitude of the emission current transferred to the light emitting diode LED may be changed, so that luminance of the light emitting diode LED may also be changed. The driving voltage line 172 may apply a driving voltage ELVDD, and the driving low voltage line 178 may apply a driving low voltage ELVSS. The reference voltage line 127 may transfer a reference voltage Vref, and the initialization voltage line 128 may transfer an initialization voltage VINT. The overlapping electrode voltage line 129 may transfer an overlapping electrode voltage VBML applied to an overlapping electrode (hereinafter also referred to as a second driving gate electrode) overlapping a channel of the driving transistor T1, and the compensation voltage line 173 may transfer a compensation voltage Vcomp to a first electrode Drain of the driving transistor T1. In an embodiment, voltages applied to the driving voltage line 172, the driving low voltage line 178, the reference voltage line 127, the initialization voltage line 128, the overlapping electrode voltage line 129, and the compensation voltage line 173 may each be a constant voltage.

The driving transistor T1 (also referred to as a first transistor) may be a transistor that adjusts a level of an emission current outputted to an electrode (anode) of the light emitting diode LED depending on a level of a voltage of the driving gate electrode (i.e., the voltage stored in the second transfer electrode of the transfer capacitor Cpr). Brightness of the light emitting diode LED may be adjusted depending on the magnitude of the emission current outputted to an electrode of the light emitting diode LED, and thus emission luminance of the light emitting diode LED may be adjusted depending on a data voltage Vdata applied to the pixel. For this purpose, the first electrode Drain of the driving transistor T1 may be connected to the driving voltage line 172 via the sixth transistor T6 by being positioned to receive the driving voltage ELVDD. The first electrode Drain of the driving transistor may also be connected to a second electrode of the ninth transistor T9 to receive the compensation voltage Vcomp. The data voltage Vdata may be applied to the driving gate electrode of the driving transistor T1 through the second transistor T2 and the transfer capacitor Cpr. The second electrode Source of the driving transistor T1 may output an emission current to the light emitting diode LED, and may be connected to an electrode (anode) of the light emitting diode LED via the seventh transistor T7 (an output control transistor). The second electrode Source of the driving transistor T1 may also be connected to the first electrode of the fifth transistor T5. The gate electrode of the driving transistor T1 may be connected to the second transfer electrode of the transfer capacitor Cpr. Accordingly, the voltage of the driving gate electrode of the driving transistor T1 may change depending on a voltage stored in the transfer capacitor Cpr, and an emission current outputted by the driving transistor T1 may change accordingly. The transfer capacitor Cpr may serve to maintain a voltage of the driving gate electrode of the driving transistor T1 to be constant during a frame. The driving gate electrode of the driving transistor T1 may also be connected to the fourth transistor T4, to be initialized by receiving the reference voltage Vref. The driving transistor T1 may further include an overlapping electrode overlapping a channel positioned on the semiconductor layer, the overlapping electrode may receive the overlapping electrode voltage VBML through the eleventh transistor T11, and it may also be connected to the first electrode of the tenth transistor T10.

The second transistor T2 may be a transistor that receives the data voltage Vdata into the pixel. A gate electrode of the second transistor T2 may be connected to the first scan line 151. A first electrode of the second transistor T2 may be connected to the data line 171. The second electrode of the second transistor T2 may be connected to the D node D_node, and may be connected to the second electrode of the third transistor T3, the first transfer electrode of the transfer capacitor Cpr, and the second electrode of the storage capacitor Cst. In case that the second transistor T2 is turned on by a positive voltage of the first scan signal GW transferred through the first scan line 151, the data voltage Vdata transferred through the data line 171 may be transferred to the transfer capacitor Cpr, and the data voltage Vdata may be transferred to the driving gate electrode of the driving transistor T1 through the transfer capacitor Cpr.

The third transistor T3 may serve to transfer the reference voltage Vref to the D node D_node, and the reference voltage Vref may be transferred to the second electrode of the second transistor T2, the first electrode of the transfer capacitor Cpr, and the second electrode of the storage capacitor Cst. The gate electrode of the third transistor T3 may be connected to the second scan line 152, a first electrode of the third transistor T3 may be connected to the reference voltage line 127, and the second electrode of the third transistor T3 may be connected to the D node D_node and may be connected to the second electrode of the second transistor T2, the first electrode of the transfer capacitor Cpr, and the second electrode of the storage capacitor Cst. The third transistor T3 may be turned on by a positive voltage of the second scan signal GR received through the second scan line 152 to transfer the reference voltage Vref to the D node D node.

The fourth transistor T4 may serve to transfer the reference voltage Vref to the driving gate electrode of the driving transistor T1 and the second transfer electrode of the transfer capacitor Cpr. A gate electrode of the fourth transistor T4 may be connected to the third scan line 153, a first electrode of the fourth transistor T4 may be connected to the reference voltage line 127, and a second electrode of the fourth transistor T4 may be connected to the second transfer electrode of the transfer capacitor Cpr, the driving gate electrode of the driving transistor T1, and a second electrode of the fifth transistor T5. The fourth transistor T4 may be turned on by a positive voltage of the third scan signal GI transferred through the third scan line 153, and the reference voltage Vref may be transferred to the driving gate electrode of the driving transistor T1 and the second transfer electrode of the transfer capacitor Cpr.

The fifth transistor T5 may electrically connect the second electrode Source of the driving transistor T1 and the driving gate electrode Gate of the driving transistor T1. A gate electrode of the fifth transistor T5 may be connected to the first scan line 154, and a first electrode of the fifth transistor T5 may be connected to the first electrode Source of the driving transistor T1 and a first electrode of the seventh transistor T7. The second electrode of the fifth transistor T5 may be connected to the driving gate electrode of the driving transistor T1, the second electrode of the fourth transistor T4, and the second transfer electrode of the transfer capacitor Cpr. The fifth transistor T5 may be turned on by a positive voltage of the fourth scan signal GC transferred through the fourth scan line 154, so as to connect the second electrode Source of the driving transistor T1 and the driving gate electrode of the driving transistor T1.

The sixth transistor T6 may serve to transfer the driving voltage ELVDD to the driving transistor T1. A gate electrode of the sixth transistor T6 may be connected to the first emission control line 155, a first electrode of the sixth transistor T6 may be connected to the driving voltage line 172, and a second electrode of the sixth transistor T6 may be connected to the first electrode Drain of the driving transistor T1 and the second electrode of the ninth transistor T9.

The seventh transistor T7 may serve to transfer an emission current outputted from the driving transistor T1 to the light emitting diode. A gate electrode of the seventh transistor T7 may be connected to the first emission control line 155, a first electrode of the seventh transistor T7 may be connected to the second electrode Source of the driving transistor T1 and the first electrode of the fifth transistor T5, and a second electrode of the seventh transistor T7 may be connected to an electrode of the light emitting diode LED, the second electrode of the eighth transistor T8, and the second electrode of the tenth transistor T10.

The eighth transistor T8 may serve to initialize an electrode of the light emitting diode LED. Hereinafter, the eighth transistor T8 is also referred to as a light emitting diode initialization transistor. A gate electrode of the eighth transistor T8 may be connected to the third scan line 153, the second electrode of the eighth transistor T8 may be connected to an electrode of the light emitting diode LED, the second electrode of the seventh transistor T7, and the second electrode of the tenth transistor T10, and a first electrode of the eighth transistor T8 may be connected to the initialization voltage line 128. In case that the eighth transistor T8 is turned on by a positive voltage of the third scan signal GI flowing through the third scan line 153, the initialization voltage VINT may be applied to an electrode of the light emitting diode LED to be initialized.

The ninth transistor T9 may serve to transfer the compensation voltage Vcomp to the first electrode Drain of the driving transistor T1. A gate electrode of the ninth transistor T9 may be connected to the fourth scan line 154, a second electrode of the ninth transistor T9 may be connected to the first electrode Drain of the driving transistor T1 and the second electrode of the sixth transistor T6, and a first electrode of the ninth transistor T9 may be connected to the compensation voltage line 173. In case that the ninth transistor T9 is turned on by a positive voltage of the fourth scan signal GC flowing through the fourth scan line 154, the compensation voltage Vcomp may be applied to the first electrode Drain of the driving transistor T1.

The tenth transistor T10 may serve to maintain an electrode of the light emitting diode LED and the overlapping electrode (the second driving gate electrode) of the driving transistor T1 at the same voltage during the emission period. A gate electrode of the tenth transistor T10 may be connected to the first emission control line 155, the second electrode of the tenth transistor T10 may be connected to an electrode of the light emitting diode LED, and a first electrode of the tenth transistor T10 may be connected to the overlapping electrode of the driving transistor T1 and the second electrode of the eleventh transistor T11. The tenth transistor T10 may be turned on during the emission period to electrically connect the overlapping electrode (the second driving gate electrode) of the driving transistor T1 and an electrode of the light emitting diode LED), and since the seventh transistor T7 is turned on during the emission period, the voltage of an electrode (anode) of the light emitting diode LED may be the same as the voltage of the second electrode Source of the driving transistor T1. Accordingly, during the emission period, the tenth transistor T10 may cause a voltage of the overlapping electrode of the driving transistor T1 to have a voltage value of the second electrode Source of the driving transistor T1.

The eleventh transistor T11 may serve to transfer the overlapping electrode voltage VBML to the overlapping electrode (the second driving gate electrode) of the driving transistor T1. The gate electrode of the eleventh transistor T11 may be connected to the fourth scan line 154, the second electrode of the eleventh transistor T11 may be connected to the overlapping electrode (the second driving gate electrode) of the driving transistor T1 and the first electrode of the tenth transistor T10, and the first electrode of the eleventh transistor T11 may be connected to the overlapping electrode voltage line 129. In case that the eleventh transistor T11 is turned on by a positive voltage of the fourth scan signal GC flowing through the fourth scan line 154, the overlapping electrode voltage VBML may be applied to the overlapping electrode (the second driving gate electrode) of the driving transistor T1. The eleventh transistor T11 may be included in each pixel circuit unit included in the pixel, and according to an embodiment, as illustrated in FIG. 26, one eleventh transistor T11 may be formed across multiple pixels or multiple pixel circuit units. One eleventh transistor T11 may be formed in one row of the eleventh transistor T11 formed to correspond to the pixels.

Referring to FIG. 27, only the driving transistor T1 may include the overlapping electrode overlapping the channel included in the semiconductor layer, and according to an embodiment, and at least one of the other transistors T2, T3, T4, T5, T6, T7, T8, T9, T10, and T11 may have an overlapping electrode overlapping a channel included in the semiconductor layer. In all the transistors T2, T3, T4, T5, T6, T7, T8, and T9 except the driving transistor T1, each overlapping electrode may be electrically connected to each gate electrode, and each overlapping electrode may serve as another gate electrode (hereinafter also referred to as second gate electrode).

In the above description, all the transistors T1, T2, T3, T4, T5, T6, T7, T8, T9, T10, and T11 may be formed as n-type transistors and an oxide semiconductor may be used for the semiconductor layer, but what may be necessary for the transistors is just an n-type transistor, and a silicon semiconductor may also be used for the semiconductor layer.

The first transfer electrode of the transfer capacitor Cpr may be connected to the D node D_node to be connected to second electrode of the second transistor T2, the second electrode of the third transistor T3, and the second electrode of the storage capacitor Cst, and the second transfer electrode may be connected to the driving gate electrode Gate of the driving transistor T1, the second electrode of the fourth transistor T4, and the second electrode of the fifth transistor T5.

The first electrode of the storage capacitor Cst may be connected to the driving low voltage line 178 to receive the driving low voltage ELVSS, and the second electrode may be connected to the D node D node to be connected to the second electrode of the second transistor T2, the second electrode of the third transistor T3, and the first transfer electrode of the transfer capacitor Cpr.

A first electrode (anode) of the light emitting diode LED may be connected to the second electrode of the seventh transistor T7, the second electrode of the eighth transistor T8, and the second electrode of the tenth transistor T10, and a second electrode (cathode) of the light emitting diode LED may be connected to the driving low voltage line 178 to receive the driving low voltage ELVSS.

It has been described that a pixel PX may include 11 transistors T1 to T11, two capacitors (the transfer capacitor Cpr and the storage capacitor Cst), and a light emitting diode LED, but the disclosure is not limited thereto, and in case that the eleventh transistor T11 is formed in common as shown in FIG. 26, one pixel PX may include ten transistors T1 to T10, two capacitors (a transfer capacitor Cpr and a storage capacitor Cst), and a light emitting diode LED.

In the above, a circuit structure of a pixel according to another embodiment has been described with reference to FIG. 27.

The signal of FIG. 18 may also be applied to the pixel of FIG. 27, and an operation of the pixel of FIG. 27 may be similar to that of the pixel of FIG. 17. A difference between the pixel of FIG. 17 and the pixel of FIG. 27 may be in the fifth transistor T5 and the ninth transistor T9, and both transistors T5 and T9 may be connected to the fourth scan line 154. Since the gate-on voltage may be applied to the fourth scan line 154 during the compensation period, the pixel of FIG. 17 may be different from the pixel of FIG. 27 in the operation of the compensation period. During other sections, for example, the initialization period, the writing period, and the emission period, the operations of the pixel of FIG. 17 and the pixel of FIG. 27 may be the same. Accordingly, the pixel operation of FIG. 27 during the compensation period will be described in detail below.

Referring to FIG. 18, during the compensation period, the fourth scan signal GC may be changed to the gate-on voltage (the high level voltage), and the second scan signal GR may be maintained at the gate-on voltage, and other signals (the first emission signal EM, the first scan signal GW, and the third scan signal GI) may have the gate-off voltage.

Referring to FIG. 27, the fifth transistor T5, the ninth transistor T9, and the eleventh transistor T11 may be turned on by the fourth scan signal GC in a state in which the third transistor T3 may be turned on by the second scan signal GR. The driving gate electrode Gate and the second electrode Source of the driving transistor T1 may be connected to each other by the fifth transistor T5, the compensation voltage Vcomp may be applied to the first electrode Drain of the driving transistor T1 by the ninth transistor T9, and the overlapping electrode voltage VBML may be applied to the overlapping electrode (the second driving gate electrode) of the driving transistor T1 by the eleventh transistor T11. Herein, the overlapping electrode voltage VBML may have a high voltage, and a threshold voltage of the driving transistor T1 may be shifted in a direction depending on a magnitude of the overlapping electrode voltage VBML, and the shifted threshold voltage may be maintained. For example, it may be possible to prevent a case in which the threshold voltage of the driving transistor T1 may be shifted to not be turned on by the reference voltage Vref by using the overlapping electrode voltage VBML, and a constant output current may be generated depending on the data voltage Vdata.

Since the driving transistor T1 may be turned on in an initialization step, the first electrode Drain of the driving transistor T1 may be connected to the driving gate electrode Gate of the driving transistor T1 and the second transfer electrode of the transfer capacitor Cpr through the second electrode Source of the driving transistor T1 and the fifth transistor T5. Voltages of the driving gate electrode Gate of the driving transistor T1 and the second transfer electrode of the transfer capacitor Cpr may have a reference voltage Vref, the compensation voltage Vcomp may be applied to the first electrode Drain of the driving transistor T1, and the reference voltage Vref may have a higher voltage than the compensation voltage Vcomp, and thus in case that the voltage value stored in the second transfer electrode of the transfer capacitor Cpr gradually decreases from the reference voltage Vref and the driving transistor T1 turns off, voltage reduction stops and a corresponding voltage value may be stored in the second transfer electrode of the transfer capacitor Cst. In case that the driving transistor T1 is turned off, a voltage of the driving gate electrode Gate may be higher than a voltage of the first electrode Drain of the driving transistor T1 by a threshold voltage Vth, and thus in case that the compensation period ends, the voltage of the second transfer electrode of the transfer capacitor Cpr may be higher than the compensation voltage Vcomp by the threshold voltage Vth of the driving transistor T1. A voltage of the second transfer electrode of the transfer capacitor Cst may be the same as a voltage of the driving gate electrode of the driving transistor T1, and the voltage of the driving gate electrode may be as Equation 3 above.

During the compensation period as described above, a more uniform compensation operation may be performed as the data voltage Vdata that varies depending on a gray level may not be applied, but a constant compensation voltage Vcomp may be applied and compensated.

In the pixel of FIG. 27, operations of the writing period and the emission period after the compensation period may be the same as those of the pixel of FIG. 17, and an operation of the initialization period before the compensation period may be the same as that of the pixel of FIG. 17. A detailed description thereof will be omitted.

In the above, in order to distinguish an embodiment of FIG. 17 from an embodiment of FIG. 27, all of the first electrodes of the driving transistor T1 may be described as Drain and all of the second electrodes may be described as Source, but according to an embodiment, the first electrode may be a source, and the second electrode may be a drain.

Hereinafter, a modified structure of the pixel structure of FIG. 27 will be described with reference to FIG. 28 to FIG. 30.

Figure 28:
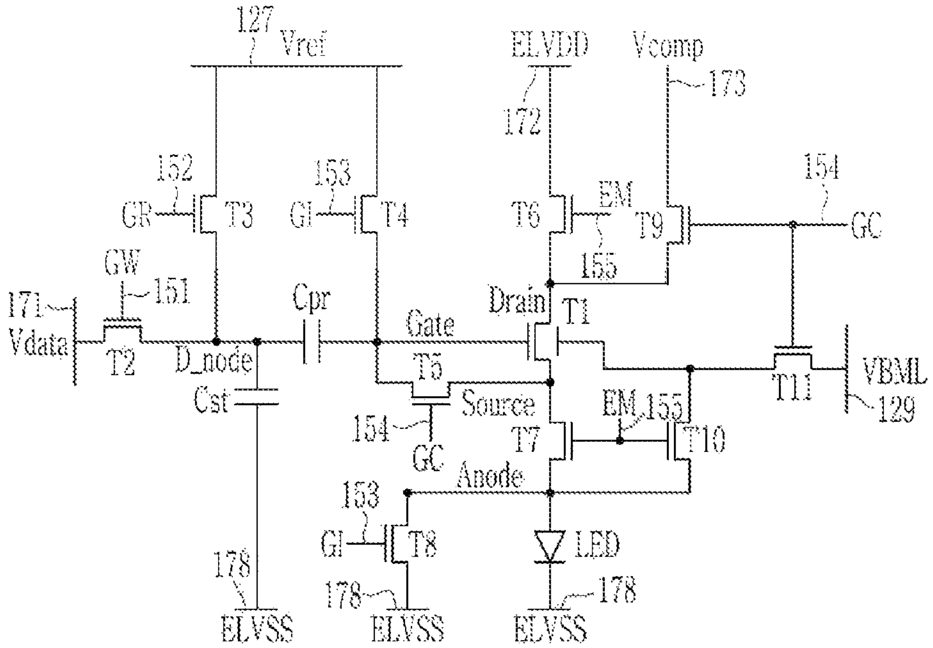
FIG. 28 to FIG. 30 each schematically illustrate a circuit diagram of a modified pixel according to an embodiment of FIG. 27.
Figure 29:
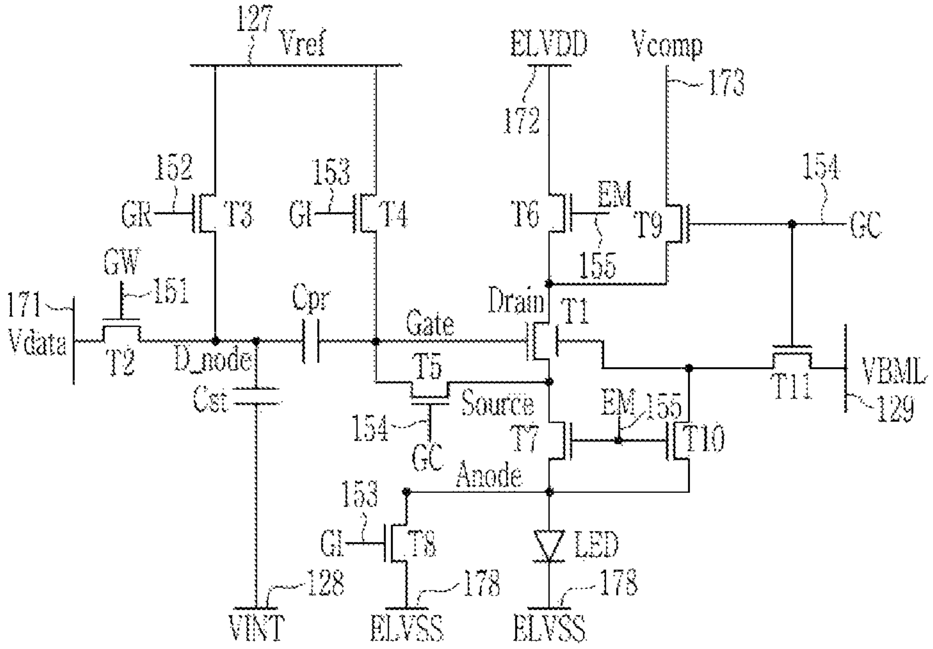
Figure 30:
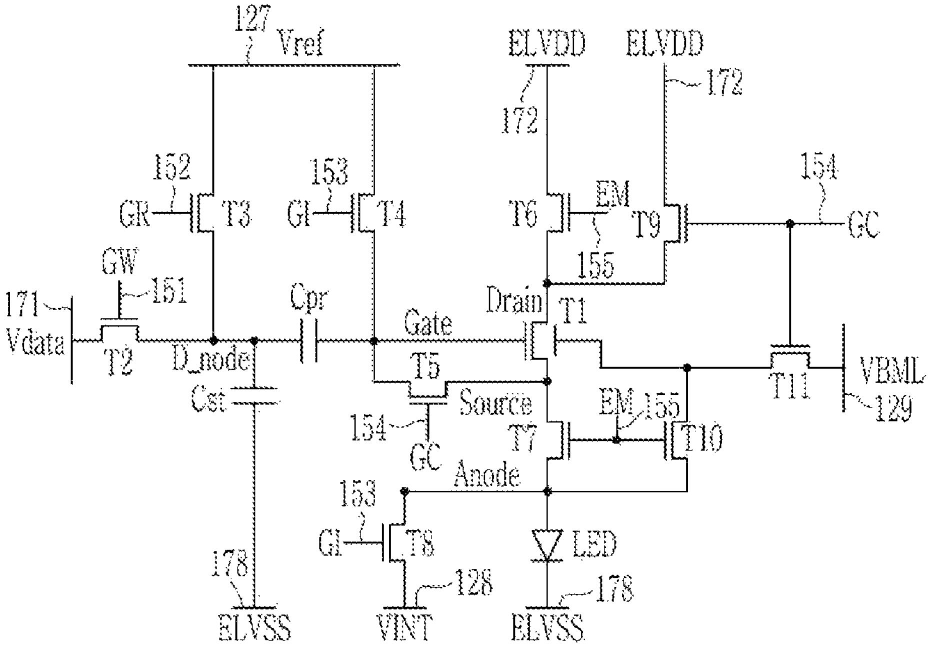

FIG. 28 to FIG. 30 each schematically illustrate a circuit diagram of a modified pixel according to an embodiment of FIG. 27.

Unlike in the pixel of FIG. 27, in the pixel according to an embodiment of FIG. 28, a first electrode of the eighth transistor T8 may be connected to the driving low voltage line 178 instead of the initialization voltage line 128.

In an embodiment of FIG. 28, an electrode (anode) of the light emitting diode LED may be initialized to the driving low voltage ELVSS during the initialization period. In an embodiment of FIG. 28, there may be an advantage that the initialization voltage line 128 may not be formed.

An embodiment of FIG. 29 is an embodiment in which, unlike the pixel of FIG. 27, the first electrode of the storage capacitor Cst may be connected to the initialization voltage line 128 instead of the driving low voltage line 178.

An embodiment of FIG. 30 is an embodiment in which, unlike the pixel of FIG. 27, the first electrode of the eighth transistor T8 may be connected to the driving voltage line 172 instead of the compensation voltage line 173.

In an embodiment of FIG. 30, during the compensation period, the driving voltage ELVDD may be applied to the first electrode Drain of the driving transistor T1, and unlike Equation 3, a voltage of the driving gate electrode of the driving transistor T1 may be higher than the driving voltage ELVDD by the threshold voltage Vth of the driving transistor T1. The reference voltage Vref may have a higher voltage value than the driving voltage ELVDD. In the embodiment of FIG. 30, there may be an advantage that the compensation voltage line 173 may not be formed.

In embodiments of FIG. 27 to FIG. 30, they may have a same structure in which one eleventh transistor T11 transfers the overlapping electrode voltage VBML to the overlapping electrode (the second driving gate electrode) of the driving transistor T1 included in the pixels, thereby having a structure as shown in FIG. 26.

While this disclosure has been described in connection with what is considered to be practical embodiments, it is to be understood that the disclosure is not limited to the disclosed embodiments, but, on the contrary, is intended to cover various modifications and equivalent arrangements included within the spirit and scope of the disclosure.

What is claimed is:

1. An emissive display device comprising:
- a driving transistor including a first electrode, a second electrode, and a driving gate electrode;
- a second transistor including a first electrode electrically connected to a data line;
- a transfer capacitor including a first transfer electrode electrically connected to a second electrode of the second transistor and a second transfer electrode electrically connected to the driving gate electrode;
- a fifth transistor electrically connecting the first electrode of the driving transistor and the driving gate electrode;
- a ninth transistor including a second electrode electrically connected to the second electrode of the driving transistor; and
- a light emitting diode including an anode and a cathode receiving an output current outputted to the second electrode of the driving transistor.

2. The emissive display device of claim 1, wherein
- a first electrode of the ninth transistor is electrically connected to at least one of a compensation voltage line and a driving voltage line.

3. The emissive display device of claim 1, wherein
- the driving transistor further includes a second driving gate electrode, and the emissive display device further comprises an eleventh transistor including a first electrode electrically connected to an overlapping electrode voltage line and a second electrode electrically connected to the second driving gate electrode.

4. The emissive display device of claim 3, wherein the second electrode of the eleventh transistor is electrically connected to one or more second driving gate electrodes.

5. The emissive display device of claim 3, wherein a gate electrode of the fifth transistor, a gate electrode of the ninth transistor, and a gate electrode of the eleventh transistor are electrically connected to a fourth scan line.

6. The emissive display device of claim 5, wherein the fourth scan line transfers a gate-on voltage during a compensation period.

7. The emissive display device of claim 3, further comprising:

a sixth transistor including a first electrode electrically connected to a driving voltage line and a second electrode electrically connected to the first electrode of the driving transistor; and a seventh transistor including a first electrode electrically connected to the second electrode of the driving transistor and a second electrode electrically connected to the anode of the light emitting diode.

8. The emissive display device of claim 7, further comprising:

a tenth transistor including a first electrode electrically connected to the second driving gate electrode and a second electrode electrically connected to the anode of the light emitting diode.

9. The emissive display device of claim 8, wherein the cathode of the light emitting diode is electrically connected to a driving low voltage line, and the emissive display device further comprises an eighth transistor including a first electrode electrically connected to at least one of an initializing voltage line and the driving low voltage line, and a second electrode electrically connected to the anode of the light emitting diode.

10. The emissive display device of claim 9, further comprising:

a third transistor including a first electrode electrically connected to at least one of a reference voltage line and the driving voltage line, and a second electrode electrically connected to the second electrode of the second transistor and the first transfer electrode; and a fourth transistor including a first electrode electrically connected to the reference voltage line, and a second electrode electrically connected to the driving gate electrode and the second transfer electrode.

11. An emissive display device comprising:

a driving transistor including a first electrode, a second electrode, and a driving gate electrode;

a second transistor including a first electrode electrically connected to a data line;

a transfer capacitor including a first transfer electrode electrically connected to a second electrode of the second transistor and a second transfer electrode electrically connected to the driving gate electrode;

a fifth transistor electrically connecting the second electrode of the driving transistor and the driving gate electrode;

a ninth transistor including a second electrode electrically connected to the first electrode of the driving transistor; and a light emitting diode including an anode and a cathode receiving an output current outputted to the second electrode of the driving transistor.

12. The emissive display device of claim 11, wherein a first electrode of the ninth transistor is electrically connected to at least one of a compensation voltage line and a driving voltage line.

13. The emissive display device of claim 11, wherein the driving transistor further includes a second driving gate electrode, and the emissive display device further comprises an eleventh transistor including a first electrode electrically connected to an overlapping electrode voltage line and a second electrode electrically connected to the second driving gate electrode.

14. The emissive display device of claim 13, wherein the second electrode of the eleventh transistor is electrically connected to one or more second driving gate electrodes.

15. The emissive display device of claim 13, wherein a gate electrode of the fifth transistor, a gate electrode of the ninth transistor, and a gate electrode of the eleventh transistor are electrically connected to a fourth scan line.

16. The emissive display device of claim 15, wherein the fourth scan line transfers a gate-on voltage during a compensation period.

17. The emissive display device of claim 13, further comprising:

a sixth transistor including a first electrode electrically connected to a driving voltage line and a second electrode electrically connected to the first electrode of the driving transistor; and a seventh transistor including a first electrode electrically connected to the second electrode of the driving transistor and a second electrode electrically connected to the anode of the light emitting diode.

18. The emissive display device of claim 17, further comprising a tenth transistor including a first electrode electrically connected to the second driving gate electrode and a second electrode electrically connected to the anode of the light emitting diode.

19. The emissive display device of claim 18, wherein the cathode of the light emitting diode is electrically connected to a driving low voltage line, and the emissive display device further comprises an eighth transistor including a first electrode electrically connected to at least one of an initializing voltage line and the driving low voltage line, and a second electrode electrically connected to the anode of the light emitting diode.

20. The emissive display device of claim 19, further comprising:

a third transistor including a first electrode electrically connected to at least one of a reference voltage line and the driving voltage line, and a second electrode electrically connected to the second electrode of the second transistor and the first transfer electrode; and a fourth transistor including a first electrode electrically connected to the reference voltage line, and a second electrode electrically connected to the driving gate electrode and the second transfer electrode.

* * * * *